US011411984B2

(12) United States Patent
Lietz et al.

(10) Patent No.: US 11,411,984 B2
(45) Date of Patent: *Aug. 9, 2022

(54) REPLACING A POTENTIALLY THREATENING VIRTUAL ASSET

(71) Applicant: Intuit Inc., Mountain View, CA (US)

(72) Inventors: M. Shannon Lietz, San Marcos, CA (US); Luis Felipe Cabrera, Bellevue, WA (US); Thomas Bishop, San Diego, CA (US); Brett Weaver, San Diego, CA (US); Capen Brinkley, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/936,411

(22) Filed: Jul. 22, 2020

(65) Prior Publication Data
US 2020/0358811 A1 Nov. 12, 2020

Related U.S. Application Data

(63) Continuation of application No. 15/881,400, filed on Jan. 26, 2018, now Pat. No. 10,757,133, which is a
(Continued)

(51) Int. Cl.
*H04L 9/40* (2022.01)
*G06F 21/57* (2013.01)
(Continued)

(52) U.S. Cl.
CPC ............ *H04L 63/1441* (2013.01); *G06F 8/60* (2013.01); *G06F 11/3664* (2013.01);
(Continued)

(58) Field of Classification Search
CPC ............ H04L 63/1441; H04L 63/1408; H04L 63/1416; H04L 63/107; G06F 8/60;
(Continued)

(56) References Cited

U.S. PATENT DOCUMENTS 5,712,641 A 1/1998 Casabona et al.
5,731,991 A 3/1998 Kinra et al.
(Continued)

FOREIGN PATENT DOCUMENTS

EP 2541420 A1 1/2013
WO WO2002091182 A1 11/2002
(Continued)

OTHER PUBLICATIONS

Tupakula et al., "Intrusion Detection Techniques for Infrastruture as a Service Cloud," 2011 IEEE Ninth International Conference on Dependable, Autonomic and Secure Computing, Dec. 12-14, 2011, IEEE.
(Continued)

*Primary Examiner* — Robert B Leung
(74) *Attorney, Agent, or Firm* — Paradice & Li LLP

(57) ABSTRACT

Big data analysis methods and machine learning based models are used to provide offer recommendations to consumers that are probabilistically determined to be relevant to a given consumer. Machine learning based matching of user attributes and offer attributes is first performed to identify potentially relevant offers for a given consumer. A deduplication process is then used to identify and eliminate any offers represented in the offer data that the consumer has already seen, has historically shown no interest in, has already accepted, that are directed to product or service types the user/consumer already owns, for which the user does not qualify, or that are otherwise deemed to be irrelevant to the consumer.

20 Claims, 7 Drawing Sheets

Related U.S. Application Data continuation-in-part of application No. 15/854,571, filed on Dec. 26, 2017, now Pat. No. 10,050,997, which is a continuation of application No. 14/319,286, filed on Jun. 30, 2014, now Pat. No. 9,866,581, and a continuation-in-part of application No. 14/186,801, filed on Feb. 21, 2014, now Pat. No. 10,121,007.

(51) Int. Cl.
  *G06F 11/36* (2006.01)
  *G06F 21/53* (2013.01)
  *G06F 8/60* (2018.01)
  *G06F 21/60* (2013.01)
  *G06F 21/55* (2013.01)
  *G06F 21/56* (2013.01)

(52) U.S. Cl.
  CPC ............ *G06F 21/53* (2013.01); *G06F 21/552* (2013.01); *G06F 21/564* (2013.01); *G06F 21/57* (2013.01); *G06F 21/606* (2013.01); *H04L 63/1408* (2013.01); *H04L 63/107* (2013.01); *H04L 63/1416* (2013.01)

(58) Field of Classification Search
  CPC ...... G06F 21/53; G06F 21/564; G06F 21/552; G06F 21/57; G06F 21/606
  See application file for complete search history.

(56) References Cited

U.S. PATENT DOCUMENTS

| | | | |
|---|---|---|---|
| 6,085,224 A | 7/2000 | Wagner | |
| 6,178,452 B1 | 1/2001 | Miyamoto | |
| 6,205,552 B1 | 3/2001 | Fudge | |
| 6,321,338 B1 | 11/2001 | Porras et al. | |
| 6,343,236 B1 | 1/2002 | Gibson et al. | |
| 6,549,932 B1 | 4/2003 | McNally et al. | |
| 6,651,183 B1 | 11/2003 | Gensler et al. | |
| 7,055,062 B2 | 5/2006 | Shah et al. | |
| 7,114,183 B1 | 9/2006 | Joiner | |
| 7,296,261 B2 | 11/2007 | Witchel et al. | |
| 7,373,524 B2 | 5/2008 | Motsinger et al. | |
| 7,426,745 B2 | 9/2008 | McCarty | |
| 7,437,764 B1* | 10/2008 | Sobel ............... G06F 21/562 713/176 |
| 7,506,371 B1 | 3/2009 | Ben-Natan | |
| 7,552,424 B1 | 6/2009 | Bischof et al. | |
| 7,596,625 B2 | 9/2009 | Manion et al. | |
| 7,600,153 B2 | 10/2009 | Cabrera et al. | |
| 7,640,458 B2 | 12/2009 | Rao et al. | |
| 7,761,923 B2 | 7/2010 | Khuti et al. | |
| 7,788,235 B1 | 8/2010 | Yeo | |
| 7,792,256 B1 | 9/2010 | Arledge et al. | |
| 7,831,570 B2 | 11/2010 | Sack et al. | |
| 7,925,527 B1 | 4/2011 | Flam | |
| 7,934,229 B1 | 4/2011 | Vogel | |
| 7,944,355 B2 | 5/2011 | Kumar et al. | |
| 7,996,836 B1 | 8/2011 | McCorkendale et al. | |
| 8,001,422 B1 | 8/2011 | Sun et al. | |
| 8,095,962 B2 | 1/2012 | Condon | |
| 8,108,855 B2 | 1/2012 | Dias et al. | |
| 8,161,475 B2 | 4/2012 | Araujo et al. | |
| 8,171,485 B2 | 5/2012 | Muller | |
| 8,171,554 B2 | 5/2012 | Elovici et al. | |
| 8,181,036 B1 | 5/2012 | Nachenberg | |
| 8,266,670 B1 | 9/2012 | Merkow et al. | |
| 8,281,399 B1 | 10/2012 | Chen et al. | |
| 8,312,516 B1 | 11/2012 | Malatesta | |
| 8,325,727 B2 | 12/2012 | Eddleston et al. | |
| 8,327,373 B2 | 12/2012 | Srinivasan | |
| 8,392,496 B2 | 3/2013 | Linden et al. | |
| 8,438,643 B2 | 5/2013 | Wiemer et al. | |
| 8,510,821 B1 | 8/2013 | Brandwine et al. | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,566,946 B1 | 10/2013 | Aziz et al. | |
| 8,572,733 B1 | 10/2013 | Rockwood | |
| 8,615,785 B2 | 12/2013 | Elrod et al. | |
| 8,621,618 B1 | 12/2013 | Ramsey et al. | |
| 8,683,585 B1 | 3/2014 | Chen et al. | |
| 8,688,820 B1 | 4/2014 | Bhogi et al. | |
| 8,726,383 B2 | 5/2014 | Blackwell | |
| 8,776,050 B2 | 7/2014 | Plouffe et al. | |
| 8,813,225 B1 | 8/2014 | Fuller et al. | |
| 8,863,284 B1 | 10/2014 | Polyakov et al. | |
| 8,959,633 B1 | 2/2015 | Dokey et al. | |
| 8,990,935 B1 | 3/2015 | Cutts | |
| 9,047,582 B2 | 6/2015 | Hutchinson et al. | |
| 9,049,105 B1 | 6/2015 | Feinstein et al. | |
| 9,112,841 B1 | 8/2015 | Brandwine et al. | |
| 9,215,153 B2 | 12/2015 | DeLuca et al. | |
| 9,245,117 B2 | 1/2016 | Weaver et al. | |
| 9,246,935 B2 | 1/2016 | Lietz et al. | |
| 9,270,690 B2 | 2/2016 | Kraitsman et al. | |
| 9,276,945 B2 | 3/2016 | Lietz et al. | |
| 9,313,281 B1 | 4/2016 | Lietz et al. | |
| 9,319,415 B2 | 4/2016 | Lietz et al. | |
| 9,323,926 B2 | 4/2016 | Cabrera et al. | |
| 9,325,726 B2 | 4/2016 | Lietz et al. | |
| 9,330,263 B2 | 5/2016 | Cabrera et al. | |
| 9,374,389 B2 | 6/2016 | Bishop et al. | |
| 9,424,058 B1* | 8/2016 | Wasson ............... G06F 9/45558 |
| 9,459,987 B2 | 10/2016 | Weaver et al. | |
| 9,473,481 B2 | 10/2016 | Lietz et al. | |
| 9,501,345 B1 | 11/2016 | Lietz et al. | |
| 9,516,064 B2 | 12/2016 | Lietz et al. | |
| 9,591,015 B1 | 3/2017 | Amin et al. | |
| 9,596,251 B2 | 3/2017 | Lietz et al. | |
| 9,686,301 B2 | 6/2017 | Lietz et al. | |
| 9,742,794 B2 | 8/2017 | Cabrera et al. | |
| 9,807,116 B2 | 10/2017 | Frascadore et al. | |
| 9,811,435 B2 | 11/2017 | Babakhan et al. | |
| 9,866,581 B2 | 1/2018 | Lietz et al. | |
| 9,900,322 B2 | 2/2018 | Lietz et al. | |
| 9,923,909 B2 | 3/2018 | Lietz et al. | |
| 10,055,247 B2 | 8/2018 | Cabrera et al. | |
| 11,153,341 B1 | 10/2021 | Ismael et al. | |
| 2002/0066034 A1 | 5/2002 | Schlossberg et al. | |
| 2002/0099992 A1 | 7/2002 | Distler et al. | |
| 2002/0116404 A1 | 8/2002 | Cha et al. | |
| 2002/0138416 A1 | 9/2002 | Lovejoy et al. | |
| 2002/0147803 A1 | 10/2002 | Dodd et al. | |
| 2002/0156904 A1 | 10/2002 | Gullotta et al. | |
| 2003/0037263 A1 | 2/2003 | Kamat et al. | |
| 2003/0046128 A1 | 3/2003 | Heinrich | |
| 2003/0051154 A1 | 3/2003 | Barton et al. | |
| 2003/0084327 A1 | 5/2003 | Lingafelt et al. | |
| 2003/0088791 A1 | 5/2003 | Porras et al. | |
| 2003/0110392 A1 | 6/2003 | Aucsmith et al. | |
| 2003/0188191 A1 | 10/2003 | Aaron et al. | |
| 2003/0195959 A1 | 10/2003 | Labadie et al. | |
| 2003/0233438 A1 | 12/2003 | Hutchinson et al. | |
| 2004/0006704 A1 | 1/2004 | Dahlstrom et al. | |
| 2004/0044891 A1 | 3/2004 | Hanzlik et al. | |
| 2004/0181775 A1 | 9/2004 | Anonsen et al. | |
| 2004/0237093 A1 | 11/2004 | Sluiman et al. | |
| 2004/0249973 A1 | 12/2004 | Alkhatib et al. | |
| 2004/0249974 A1 | 12/2004 | Alkhatib et al. | |
| 2005/0018618 A1 | 1/2005 | Mualem et al. | |
| 2005/0066309 A1 | 3/2005 | Creamer et al. | |
| 2005/0091304 A1 | 4/2005 | Trayler | |
| 2005/0114836 A1 | 5/2005 | Fu | |
| 2005/0155013 A1 | 7/2005 | Carrigan | |
| 2005/0172162 A1 | 8/2005 | Takahashi et al. | |
| 2005/0182969 A1 | 8/2005 | Ginter et al. | |
| 2005/0188222 A1 | 8/2005 | Motsinger et al. | |
| 2005/0193231 A1 | 9/2005 | Scheuren | |
| 2005/0193269 A1 | 9/2005 | Haswell et al. | |
| 2005/0204151 A1 | 9/2005 | Fang et al. | |
| 2005/0278790 A1 | 12/2005 | Birk et al. | |
| 2006/0031407 A1 | 2/2006 | Dispensa et al. | |
| 2006/0037077 A1 | 2/2006 | Gadde et al. | |

(56) References Cited

U.S. PATENT DOCUMENTS

| | | |
|---|---|---|
| 2006/0064740 A1 | 3/2006 | Kelley et al. |
| 2006/0090206 A1 | 4/2006 | Ladner et al. |
| 2006/0101520 A1 | 5/2006 | Schumaker et al. |
| 2006/0117209 A1 | 6/2006 | Drouet et al. |
| 2006/0136720 A1 | 6/2006 | Armstrong et al. |
| 2006/0184838 A1 | 8/2006 | Singonahalli et al. |
| 2006/0195745 A1 | 8/2006 | Keromytis et al. |
| 2006/0203739 A1 | 9/2006 | Padmanabhan et al. |
| 2006/0272018 A1 | 11/2006 | Fouant |
| 2006/0293940 A1 | 12/2006 | Tsyganskiy et al. |
| 2007/0006304 A1 | 1/2007 | Kramer et al. |
| 2007/0027999 A1 | 2/2007 | Allen et al. |
| 2007/0079168 A1 | 4/2007 | Sivakumar et al. |
| 2007/0094711 A1 | 4/2007 | Corley et al. |
| 2007/0157311 A1 | 7/2007 | Meier et al. |
| 2007/0180509 A1 | 8/2007 | Swartz et al. |
| 2007/0185875 A1 | 8/2007 | Chang et al. |
| 2007/0250424 A1 | 10/2007 | Kothari |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0184079 A1 | 7/2008 | Merriman et al. |
| 2008/0244744 A1 | 10/2008 | Thomas et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2008/0307525 A1 | 12/2008 | Nickle |
| 2009/0007100 A1 | 1/2009 | Field et al. |
| 2009/0007264 A1 | 1/2009 | Chatterjee et al. |
| 2009/0049553 A1 | 2/2009 | Vasudeva |
| 2009/0083695 A1 | 3/2009 | Mir et al. |
| 2009/0089682 A1 | 4/2009 | Baier et al. |
| 2009/0103539 A1 | 4/2009 | Keeler et al. |
| 2009/0106838 A1 | 4/2009 | Clark et al. |
| 2009/0172788 A1 | 7/2009 | Vedula et al. |
| 2009/0177717 A1 | 7/2009 | Meehan et al. |
| 2009/0199273 A1 | 8/2009 | Yalamanchi |
| 2009/0205039 A1 | 8/2009 | Ormazabal et al. |
| 2009/0228973 A1 | 9/2009 | Kumar et al. |
| 2009/0254970 A1 | 10/2009 | Agarwal et al. |
| 2009/0254990 A1 | 10/2009 | McGee |
| 2009/0288078 A1 | 11/2009 | Makonahalli et al. |
| 2009/0293056 A1 | 11/2009 | Ferris et al. |
| 2009/0300045 A1 | 12/2009 | Chaudhry et al. |
| 2009/0300423 A1 | 12/2009 | Ferris |
| 2009/0319527 A1 | 12/2009 | King et al. |
| 2009/0328030 A1 | 12/2009 | Fries |
| 2010/0020700 A1 | 1/2010 | Kailash et al. |
| 2010/0030544 A1 | 2/2010 | Gopalan et al. |
| 2010/0030878 A1 | 2/2010 | Grabowski et al. |
| 2010/0042734 A1 | 2/2010 | Olafsson et al. |
| 2010/0057660 A1 | 3/2010 | Kato |
| 2010/0070964 A1 | 3/2010 | Blumfield et al. |
| 2010/0077203 A1 | 3/2010 | Ogawa et al. |
| 2010/0122317 A1 | 5/2010 | Yadav |
| 2010/0175108 A1 | 7/2010 | Protas |
| 2010/0192220 A1 | 7/2010 | Heizmann et al. |
| 2010/0199351 A1 | 8/2010 | Protas |
| 2010/0212010 A1 | 8/2010 | Stringer et al. |
| 2010/0217850 A1 | 8/2010 | Ferris |
| 2010/0251004 A1 | 9/2010 | Schuba et al. |
| 2010/0251363 A1 | 9/2010 | Todorovic |
| 2010/0257267 A1 | 10/2010 | Sohn et al. |
| 2010/0257580 A1 | 10/2010 | Zhao |
| 2010/0257599 A1 | 10/2010 | Gleichauf |
| 2010/0269121 A1 | 10/2010 | Montesissa et al. |
| 2010/0287530 A1 | 11/2010 | MacLean et al. |
| 2010/0306268 A1 | 12/2010 | Bhatti et al. |
| 2010/0306354 A1 | 12/2010 | DeHaan et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0040825 A1 | 2/2011 | Ramzan et al. |
| 2011/0047621 A1 | 2/2011 | Brando et al. |
| 2011/0055921 A1 | 3/2011 | Narayanaswamy et al. |
| 2011/0083122 A1 | 4/2011 | Chen et al. |
| 2011/0101109 A1 | 5/2011 | Bona et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0167494 A1 | 7/2011 | Bowen et al. |
| 2011/0173699 A1 | 7/2011 | Figlin et al. |
| 2011/0208677 A1 | 8/2011 | Zhou et al. |
| 2011/0208797 A1 | 8/2011 | Kim |
| 2011/0238855 A1 | 9/2011 | Korsunsky et al. |
| 2011/0249970 A1 | 10/2011 | Eddleston et al. |
| 2012/0005750 A1 | 1/2012 | Satish |
| 2012/0011510 A1 | 1/2012 | Yamakabe et al. |
| 2012/0030767 A1 | 2/2012 | Rippert, Jr. et al. |
| 2012/0039336 A1 | 2/2012 | Richmond et al. |
| 2012/0042362 A1 | 2/2012 | Vlasov et al. |
| 2012/0072985 A1 | 3/2012 | Davne et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0144489 A1 | 6/2012 | Jerrett et al. |
| 2012/0151488 A1 | 6/2012 | Arcese et al. |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210425 A1 | 8/2012 | Porras et al. |
| 2012/0210437 A1 | 8/2012 | Karande et al. |
| 2012/0233668 A1 | 9/2012 | Leafe et al. |
| 2012/0266167 A1 | 10/2012 | Spiers et al. |
| 2012/0303776 A1 | 11/2012 | Ferris |
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324572 A1 | 12/2012 | Gordon et al. |
| 2012/0324576 A1 | 12/2012 | Clark et al. |
| 2013/0019242 A1 | 1/2013 | Chen et al. |
| 2013/0019314 A1 | 1/2013 | Ji et al. |
| 2013/0046667 A1 | 2/2013 | Hill et al. |
| 2013/0054792 A1 | 2/2013 | Sharaf |
| 2013/0055246 A1 | 2/2013 | Li et al. |
| 2013/0055398 A1 | 2/2013 | Li et al. |
| 2013/0067067 A1 | 3/2013 | Mir et al. |
| 2013/0074181 A1 | 3/2013 | Singh |
| 2013/0091376 A1 | 4/2013 | Raspudic et al. |
| 2013/0097316 A1 | 4/2013 | Bender et al. |
| 2013/0104237 A1 | 4/2013 | Riley et al. |
| 2013/0117809 A1 | 5/2013 | McDougal et al. |
| 2013/0117852 A1 | 5/2013 | Stute |
| 2013/0125121 A1 | 5/2013 | White |
| 2013/0132854 A1 | 5/2013 | Raleigh et al. |
| 2013/0132950 A1 | 5/2013 | McLeod et al. |
| 2013/0133072 A1 | 5/2013 | Kraitsman et al. |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227550 A1 | 8/2013 | Weinstein et al. |
| 2013/0227695 A1 | 8/2013 | Shankar |
| 2013/0238786 A1 | 9/2013 | Khesin |
| 2013/0247133 A1* | 9/2013 | Price ................ G06F 21/577 726/1 |
| 2013/0247135 A1 | 9/2013 | Kundu et al. |
| 2013/0247206 A1 | 9/2013 | Hugard et al. |
| 2013/0263209 A1 | 10/2013 | Panuganty |
| 2013/0263226 A1 | 10/2013 | Sudia |
| 2013/0276108 A1 | 10/2013 | Blackwell |
| 2013/0276152 A1 | 10/2013 | Hirsch et al. |
| 2013/0291068 A1 | 10/2013 | Huang et al. |
| 2013/0291087 A1 | 10/2013 | Kailash et al. |
| 2013/0304693 A1* | 11/2013 | Jaeger ................ G06Q 90/00 707/602 |
| 2013/0305244 A1 | 11/2013 | Pohlmann et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |

(56) References Cited

U.S. PATENT DOCUMENTS

| | | |
|---|---|---|
| 2013/0333040 A1 | 12/2013 | Diehl et al. |
| 2013/0339514 A1 | 12/2013 | Crank et al. |
| 2013/0343207 A1 | 12/2013 | Cook et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0026231 A1 | 1/2014 | Barak et al. |
| 2014/0040299 A1 | 2/2014 | Datla et al. |
| 2014/0068784 A1 | 3/2014 | Merkow et al. |
| 2014/0074799 A1 | 3/2014 | Karampuri et al. |
| 2014/0082621 A1 | 3/2014 | Fitzgerald et al. |
| 2014/0089204 A1 | 3/2014 | Spies et al. |
| 2014/0096134 A1 | 4/2014 | Barak et al. |
| 2014/0115578 A1 | 4/2014 | Cooper et al. |
| 2014/0137114 A1* | 5/2014 | Bolte ............... G06F 9/45558 718/1 |
| 2014/0165130 A1 | 6/2014 | Zaitsev |
| 2014/0172806 A1 | 6/2014 | Wilding |
| 2014/0173738 A1 | 6/2014 | Condry et al. |
| 2014/0189090 A1 | 7/2014 | Mikkilineni |
| 2014/0189680 A1 | 7/2014 | Kripalani |
| 2014/0196115 A1 | 7/2014 | Pelykh |
| 2014/0201836 A1 | 7/2014 | Amsler |
| 2014/0214460 A1 | 7/2014 | Rahnama |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0289854 A1 | 9/2014 | Mahvi |
| 2014/0317737 A1 | 10/2014 | Shin et al. |
| 2014/0344933 A1 | 11/2014 | Huh et al. |
| 2015/0032587 A1 | 1/2015 | Broom et al. |
| 2015/0033223 A1 | 1/2015 | Chari et al. |
| 2015/0033340 A1 | 1/2015 | Giokas |
| 2015/0052108 A1 | 2/2015 | Volk et al. |
| 2015/0052402 A1 | 2/2015 | Gurumurthy et al. |
| 2015/0052520 A1 | 2/2015 | Crowell et al. |
| 2015/0067865 A1 | 3/2015 | Seacat Deluca et al. |
| 2015/0082307 A1 | 3/2015 | Bell et al. |
| 2015/0095691 A1 | 4/2015 | Edwards |
| 2015/0106939 A1 | 4/2015 | Lietz et al. |
| 2015/0128246 A1 | 5/2015 | Feghali et al. |
| 2015/0128274 A1 | 5/2015 | Giokas |
| 2015/0150123 A1 | 5/2015 | Be'ery |
| 2015/0215327 A1 | 7/2015 | Cabrera et al. |
| 2015/0222653 A1 | 8/2015 | Cabrera et al. |
| 2015/0229661 A1 | 8/2015 | Balabine et al. |
| 2015/0234672 A1 | 8/2015 | Ajiro |
| 2015/0269064 A1 | 9/2015 | Bishop et al. |
| 2015/0278523 A1 | 10/2015 | Brinkley et al. |
| 2015/0304343 A1 | 10/2015 | Cabrera et al. |
| 2015/0319186 A1 | 11/2015 | Lietz et al. |
| 2015/0347773 A1 | 12/2015 | Bonney et al. |
| 2015/0371044 A1 | 12/2015 | Horne et al. |
| 2015/0381641 A1 | 12/2015 | Cabrera et al. |
| 2016/0004863 A1 | 1/2016 | Lazri et al. |
| 2016/0034359 A1 | 2/2016 | Cabrera et al. |
| 2016/0092535 A1 | 3/2016 | Kuchibhotla et al. |
| 2016/0098340 A1 | 4/2016 | Weaver et al. |
| 2016/0234167 A1 | 8/2016 | Engel et al. |
| 2016/0371178 A1 | 12/2016 | Bishop et al. |
| 2018/0191753 A1 | 7/2018 | Lietz et al. |
| 2018/0341512 A1 | 11/2018 | Cabrera et al. |

FOREIGN PATENT DOCUMENTS

| | | |
|---|---|---|
| WO | WO2009079648 A1 | 6/2009 |
| WO | WO2012023657 A1 | 2/2012 |
| WO | WO2012135192 A2 | 10/2012 |
| WO | WO2013048111 A2 | 4/2013 |
| WO | WO2013067404 A1 | 5/2013 |
| WO | WO2015102776 A1 | 7/2015 |

OTHER PUBLICATIONS

Tupakula et al., "Security Techniques for Zero Day Attacks," Proceedings of the 7th International Wireless Communications and Mobile Computing Conference; Jul. 4-8, 2011, IEEE.

Schwarzkopf et al., "Increasting Virtual Machine Security in Cloud Enviorments," Journal of Cloud Computing: Advances, Systems, and Applications, Jul. 2012, pp. 1-12.

"Vmware Backdoor I/O Port," [online], [retrieved Sep. 2, 2015]. Retrieved from the internet. <URL: http://sites.google.com/site/chitchatvmback/backdoor>.

"What is the Virtual Machine Backdoor," [online], [retrieved Sep. 2, 2015]. Retrived from the internet. <URL: http://communities.vmware.com/thread/228415?start=0&start=0>.

* cited by examiner

REPLACING A POTENTIALLY THREATENING VIRTUAL ASSET

CROSS-REFERENCE TO RELATED APPLICATIONS

This Patent application is a continuation of, and claims priority to, U.S. patent application Ser. No. 15/881,400 entitled "METHOD AND SYSTEM FOR CREATING AND DEPLOYING VIRTUAL ASSETS" and filed Jan. 26, 2018, which is assigned to the assignee hereof, and which is further a continuation in part of, and claims priority to, U.S. Pat. No. 10,121,007 entitled "METHOD AND SYSTEM FOR PROVIDING A ROBUST AND EFFICIENT VIRTUAL ASSET VULNERABILITY MANAGEMENT AND VERIFICATION SERVICE" and filed on Feb. 21, 2014, which is assigned to the assignee hereof. U.S. patent application Ser. No. 15/881,400 is also a continuation in part of, and claims priority to, U.S. Pat. No. 10,050,997 entitled "METHOD AND SYSTEM FOR SECURE DELIVERY OF INFORMATION TO COMPUTING ENVIRONMENTS" and filed on Dec. 26, 2017, which is assigned to the assignee hereof, and which is further a continuation of, and claims priority to, U.S. Pat. No. 9,866,581 entitled "METHOD AND SYSTEM FOR SECURE DELIVERY OF INFORMATION TO COMPUTING ENVIRONMENTS" and filed on Jun. 30, 2014, which is assigned to the assignee hereof. The disclosures of all prior Applications are considered part of and are incorporated by reference in this Patent Application.

TECHNICAL FIELD

This disclosure relates generally to virtual assets, and more specifically to replacing a potentially threatening virtual asset.

DESCRIPTION OF THE RELATED TECHNOLOGY

As various forms of distributed computing, such as cloud computing, have come to dominate the computing landscape, security has become a bottleneck issue that currently prevents the complete migration of various capabilities associated with sensitive data into cloud-based infrastructures, and/or other distributive computing models. This is at least partially because many owners and operators of data centers that provide access to data and other resources are hesitant to allow their data and resources to be accessed, processed, and/or otherwise used, by virtual assets in the cloud.

A major security issue in a cloud computing environment is that vulnerabilities associated with virtual assets are not always known or understood at the time the virtual assets are created and deployed, e.g., instantiated, in a given computing environment and, once deployed, detecting and/or responding to newly identified vulnerabilities through "normal" communications channels associated with the virtual assets can be challenging, if not impossible.

Current approaches to vulnerability management that typically involve addressing vulnerabilities on an ad-hoc basis as they arise, or in a simplistic, uncoordinated, static, and largely manual, manner are no longer acceptable. Indeed, in order for applications and systems that process sensitive data to fully migrate to a cloud-based infrastructure, security issues and vulnerabilities must be addressed in a proactive, anticipatory, and comprehensive manner, where the security and invulnerability to attack of virtual assets is verified well before any potential attack can possibly occur, e.g. before deployment and publishing in a production environment.

However, currently, this type of comprehensive approach to vulnerability management and verification is largely unavailable. In addition, in the few cases where a comprehensive approach to vulnerability management and verification is attempted, the vulnerabilities are typically analyzed after deployment of the virtual assets and then each virtual asset is individually verified in the production environment. Consequently, currently, vulnerability management and verification is prohibitively expensive and resource intensive, often requiring significant amounts of dedicated hardware, software, and human administrators that are still often utilized in an ad-hoc manner.

In addition, currently, virtual asset vulnerability analysis and verification management is typically done after the virtual assets are deployed in the computing environment in which they are intended to be used, i.e., in the production computing environment. However, when the virtual assets are deployed in a production computing environment it is often the case that one or more connectivity restrictions are imposed on the virtual assets in the production computing environment. That is to say, when virtual assets are deployed in a production computing environment, they are often deployed in Virtual Private Clouds (VPCs), in designated subnets, under the control of network access control lists, in various security groups, and/or in any other connectivity controlled environment created by the imposition of one or more connectivity restrictions, as discussed herein, and/or as known in the art at the time of filing, and/or as developed after the time of filing.

Given that one or more connectivity restrictions are imposed on the virtual assets in the production computing environment, when a virtual asset is subjected to vulnerability analysis and verified in the production computing environment, there is no way for the verification system to check for vulnerabilities that may be present in a situation where one or more of the connectivity restrictions have been removed. In short, if a given virtual asset is restricted to a specific type of connectivity in a production computing environment, then any vulnerability analysis and verification process can only be performed on the specific type of connectivity provided to the virtual asset in the production computing environment. As a result, no vulnerability testing or verification can be performed on the virtual asset in the production computing environment that is associated with a different, or new, type of connectivity, or operational scenario, other than the specific type of connectivity allowed for the virtual asset in the production computing environment.

In light of the situation described above, currently, the vulnerability analysis and verification process, at best, is incomplete and only provides reasonably accurate data if the virtual assets are deployed in the production computing environment exactly as intended and no changes are made to the type of connectivity, and operational parameters, expected to be provided to the virtual assets. Consequently, serious vulnerabilities may still be present in the virtual assets that will only be revealed if there is a change in the type of connectivity and/or operational scenario associated with the virtual asset. However, if there is a change in the type of connectivity and/or operational scenario associated with the virtual asset, an unexpected vulnerability may well result and, as noted above, if this vulnerability is exploited the damage done may well be irreparable and devastating.

What is needed is a method and system for providing vulnerability analysis and verification management that extends beyond the expected connectivity restrictions and production computing environment associated with a given virtual asset and allows the virtual asset to be verified to be free of vulnerabilities in a broad range of connectivity and operational environments beyond that expected and that can be tested for in the production computing environment.

In addition, in some cases, malicious entities can take control of a virtual asset. In these cases, the malicious entity often takes over, or closes down, normal communications channels associated with the virtual asset. Consequently, in some cases, the malicious entity can mask the fact they have taken control of the virtual asset from other entities outside the virtual asset, such as entities deployed by the owner to monitor and enforce security policies. This leaves the malicious entity relatively free to manipulate the virtual asset under its control and access any data used by the virtual asset, with little concern of detection by the legitimate owner of the virtual asset. Even in cases where the legitimate owner of the virtual asset does become aware that the virtual asset has been compromised, if the malicious entity has shut down, or taken control of, the normal communications channels associated with the virtual asset, the malicious entity can thwart any traditional efforts by the legitimate owner to communicate with the virtual asset and/or repair the virtual asset.

What is needed is a method and system for protecting and repairing a virtual asset from damage by potential security threats.

SUMMARY

The systems, methods, and devices of this disclosure each have several innovative aspects, no single one of which is solely responsible for the desirable attributes disclosed herein.

One innovative aspect of the subject matter described in this disclosure can be implemented by a system for replacing a potentially threatening virtual asset. The system can include one or more processors coupled to a memory. In some implementations, the memory stores instructions that, when executed by the one or more processors, causes the system to perform operations. In some implementations, the operations include generating a test virtual asset from a virtual asset creation template, deploying the test virtual asset in a virtual asset testing environment, identifying a vulnerability in the deployed test virtual asset, remedying a corresponding vulnerability in the virtual asset creation template based on the identified vulnerability in the deployed test virtual asset, generating a current virtual asset from the remedied virtual asset creation template, deploying the current virtual asset in a production computing environment, identifying a security threat, in the deployed current virtual asset, having a level of severity greater than a value, and replacing the current virtual asset with a new virtual asset configured to monitor and protect the new virtual asset from the identified security threat.

In some implementations, execution of the instructions can cause the system to perform operations further including deploying the test virtual assets in the virtual asset testing environment and deploying the virtual assets in the production computing environment, where the production computing environment is distinct from the virtual asset testing environment. In some other implementations, the operations further include deploying a current virtual asset agent within the current virtual asset and identifying the security threat, using the current virtual asset agent, based on a determination that the security threat gained access to information stored within the current virtual asset. In some instances, the operations further include deploying a new virtual asset agent within the new virtual asset, where the new virtual asset agent includes at least one of a same operational parameter, a same communication feature, a same connectivity feature, a same allocated storage capability, a same allocated processing capability, a same allocated hardware, or a same allocated software as the current virtual asset agent. In some other instances, the operations further include requesting and installing a software update from an asset management computing system in response to the level of severity being greater than the value.

In some implementations, the new virtual asset is configured to monitor at least one of a communication port, a log file, a memory location, or a network protocol. In some other implementations, the new virtual asset is configured to compare a number of authorized open ports of the current virtual asset with a number of actual open ports of the current virtual asset. In some implementations, identifying the security threat includes determining a destination Internet Protocol (IP) address of a message received from the current virtual asset, determining a geographical location associated with the destination IP address, and determining that the geographical location is within a flagged region.

In some implementations, execution of the instructions can cause the system to perform operations further including refraining from imposing a connectivity restriction on the deployed test virtual asset and imposing the connectivity restriction on the deployed current virtual asset. In some other implementations, the operations further include installing a new version of a virtual asset agent onto the new virtual asset.

Another innovative aspect of the subject matter described in this disclosure can be implemented as a method for replacing a potentially threatening virtual asset. The method can be performed by one or more processors of a system, and can include generating a test virtual asset from a virtual asset creation template, deploying the test virtual asset in a virtual asset testing environment, identifying a vulnerability in the deployed test virtual asset, remedying a corresponding vulnerability in the virtual asset creation template based on the identified vulnerability in the deployed test virtual asset, generating a current virtual asset from the remedied virtual asset creation template, deploying the current virtual asset in a production computing environment, identifying a security threat, in the deployed current virtual asset, having a level of severity greater than a value, and replacing the current virtual asset with a new virtual asset configured to monitor and protect the new virtual asset from the identified security threat.

In some implementations, the method also includes deploying the test virtual assets in the virtual asset testing environment and deploying the virtual assets in the production computing environment, where the production computing environment is distinct from the virtual asset testing environment. In some other implementations, the method also includes deploying a current virtual asset agent within the current virtual asset and identifying the security threat, using the current virtual asset agent, based on a determination that the security threat gained access to information stored within the current virtual asset. In some instances, the method also includes deploying a new virtual asset agent within the new virtual asset, where the new virtual asset agent includes at least one of a same operational parameter, a same communication feature, a same connectivity feature, a same allocated storage capability, a same allocated processing capability, a same allocated hardware, or a same allocated software as the current virtual asset agent. In some other instances, the method also includes requesting and installing a software update from an asset management computing system in response to the level of severity being greater than the value.

In some implementations, the new virtual asset is configured to monitor at least one of a communication port, a log file, a memory location, or a network protocol. In some other implementations, the new virtual asset is configured to compare a number of authorized open ports of the current virtual asset with a number of actual open ports of the current virtual asset. In some implementations, identifying the security threat includes determining a destination Internet Protocol (IP) address of a message received from the current virtual asset, determining a geographical location associated with the destination IP address, and determining that the geographical location is within a flagged region.

In some implementations, the method also includes refraining from imposing a connectivity restriction on the deployed test virtual asset and imposing the connectivity restriction on the deployed current virtual asset. In some other implementations, the method also includes installing a new version of a virtual asset agent onto the new virtual asset.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

Figure 1:
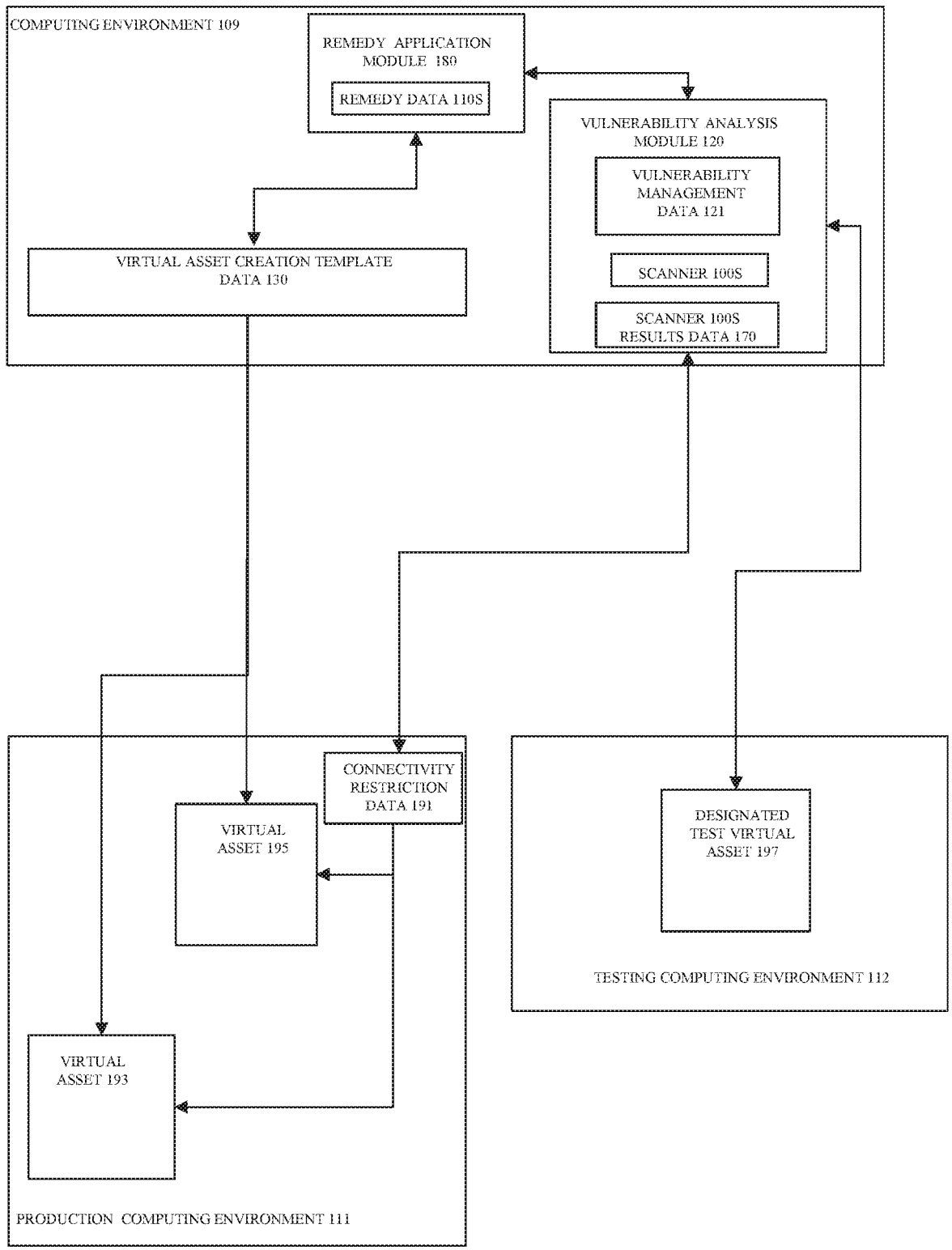
FIG. 1 is a functional block diagram showing the interaction of various elements for implementing one embodiment.

As presented above, discussed herein is an exemplary two-part system for creating and protecting virtual assets. Various aspects of the two-part system include a first part relating to creating and testing virtual assets in a testing environment, correcting a virtual asset creation template for any discrepancies found, and then instantiating one or more virtual assets from the corrected virtual asset template in a production environment.

In a second part of the two-part system, a virtual asset agent is installed on the instantiated virtual asset, where the virtual asset agent monitors aspects of the virtual asset, and if any anomalies are detected, various corrective actions are taken depending on the particular detected anomalies.

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate, application data must be transferred between a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud-based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

In accordance with one embodiment, a method and system includes providing a production computing environment in which one or more virtual assets are to be deployed. In one embodiment, a virtual asset testing environment is also provided, the virtual asset testing environment being a computing environment distinct from the production computing environment.

In one embodiment, a class of virtual assets to be vulnerability tested and verified is designated. A virtual asset creation template associated with the class of virtual assets is then identified, each virtual asset of the class of virtual assets being created using the virtual asset creation template.

In one embodiment, the virtual asset creation template is used to generate a designated test virtual asset. The designated test virtual asset is then deployed in the virtual asset testing environment. Once deployed in the virtual asset testing environment, the designated test virtual asset is analyzed to identify any vulnerabilities in the designated test virtual asset.

In one embodiment, if a vulnerability is identified in the designated test virtual asset, a remedy associated with the vulnerability identified in the designated test virtual asset is applied to the virtual asset creation template to transform the virtual asset creation template to a verified virtual asset creation template. In one embodiment, the verified virtual asset creation template is then used to create virtual assets of the virtual asset class to be deployed in the production environment.

In accordance with one embodiment, a method and system includes providing a production computing environment in which one or more virtual assets are to be deployed. In one embodiment, a virtual asset testing environment is also provided, the virtual asset testing environment being a computing environment distinct from the production computing environment.

In one embodiment, a class of virtual assets to be vulnerability tested and verified is designated. A virtual asset creation template associated with the class of virtual assets is then identified, each virtual asset of the class of virtual assets being created using the virtual asset creation template.

In one embodiment, the virtual asset creation template is used to generate a designated test virtual asset. The designated test virtual asset is then deployed in the virtual asset testing environment. Once deployed in the virtual asset testing environment, the designated test virtual asset is analyzed to identify any vulnerabilities in the designated test virtual asset.

In one embodiment, if a vulnerability is identified in the designated test virtual asset, a remedy to the vulnerability identified in the designated test virtual asset is applied to the virtual assets of the virtual asset class deployed in the production environment.

In accordance with one embodiment, a method and system includes monitoring a current virtual asset for potential security threats with a virtual asset agent running within the current virtual asset. The virtual asset agent runs, in one embodiment, within the current virtual asset and identifies potential security threats that risk compromising virtual asset data to unauthorized computing systems. The method and system determine a severity of the potential security threats that are identified for having gained access into the current virtual asset, according to one embodiment. According to one embodiment, the severity of the potential security threats is related to a content of the virtual asset data. If the severity is greater than a predetermined threshold, the method and system create a new virtual asset with the virtual asset agent and decommissions the current virtual asset, according to one embodiment. In one embodiment, creating the new virtual asset includes one or more of copying the virtual asset data to the new virtual asset, copying one or more application programs hosted by the current virtual asset to the new virtual asset, and copying the virtual asset agent to the new virtual asset to enable the new virtual asset to protect and repair the new virtual asset from damage by potential security threats. The method and system receive, with the new virtual asset, secrets that are associated with the current virtual asset to enable the new virtual asset to continue operations of the current virtual asset, according to one embodiment. For example, upon receiving the secrets of the current virtual asset, the new virtual asset are able to decrypt and encrypt one or more databases and can further establish communications channels previously used by the current virtual asset, according to one embodiment. The secrets received from an asset management computing system and include one or more passwords, passcodes, encryption keys, and any other secrets now known or later developed.

FIG. 1 is a functional diagram of the interaction of various elements associated with one embodiment of the methods and systems discussed herein. Of particular note, the various elements in FIG. 1 are shown for illustrative purposes as being associated with specific computing environments, such as computing environment 109, production computing environment 111, and testing computing environment 112. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center, a party and/or entity providing all or a portion of a cloud-based computing environment, the owner or a provider of a service, the owner or provider of one or more resources, and/or any other party and/or entity providing one or more functions, and/or any other party and/or entity as discussed herein, and/or as known in the art at the time of filing, and/or as made known after the time of filing.

In accordance with one embodiment, a method and system includes a process whereby, in one embodiment, a cloud-based production computing environment is provided in which one or more virtual assets are to be deployed.

In various embodiments, the provided production computing environment can be any form of cloud computing environment, such as, but not limited to, a public cloud; a private cloud; a virtual private network (VPN); a Virtual Private Cloud, or VPC; a sub-net; or any security/communications grouping; or any other cloud-based infrastructure, sub-structure, or architecture, as discussed herein, and/or as known in the art at the time of filing, and/or as developed after the time of filing.

In many cases, a given application or service provided through a cloud computing infrastructure may utilize, and interface with, multiple cloud computing environments, such as multiple VPCs, in the course of providing the associated service. In various embodiments, each cloud computing environment includes allocated virtual assets associated with, and controlled or used by, the party utilizing the cloud computing environment.

As noted above, in order to ensure security policies are met, when the virtual assets are deployed in the provided production computing environment, one or more connectivity restrictions are imposed on the virtual assets in the production computing environment. That is to say, when virtual assets are deployed in a production computing environment, they are often deployed in Virtual Private Clouds (VPCs), in designated subnets, under the control of network access control lists, in various security groups, and/or under any other connectivity controlled environment created by the imposition of one or more connectivity restrictions, as discussed herein, and/or as known in the art at the time of filing, and/or as developed after the time of filing.

As also noted above, given that one or more connectivity restrictions are imposed on the virtual assets in the production computing environment, when a virtual asset is subjected to vulnerability analysis and verified in the production computing environment, there is no way for the verification system to check for vulnerabilities that may be present in a situation where one or more of the connectivity restrictions have been removed. In short, if a given virtual asset is restricted to a specific type of connectivity in a production computing environment, then any vulnerability analysis and verification process can only be performed on the specific type of connectivity provided to the virtual asset in the production computing environment. As a result, no vulnerability testing or verification can be performed on the virtual asset in the production computing environment that is associated with a different, or new, type of connectivity, or operational scenario, other than the specific type of connectivity allowed for the virtual asset in the production computing environment.

To address this issue, in one embodiment, a virtual asset testing computing environment is provided. In various embodiments, the provided virtual asset testing computing environment can be any form of computing environment that is distinct and physically or logically different from the provided production computing environment. In various embodiments, the testing computing environment can itself be an isolated portion of a public cloud; a private cloud; a virtual private network (VPN); a Virtual Private Cloud, or VPC; a sub-net; or any security/communications grouping; or any other infrastructure, sub-structure, or architecture, as discussed herein, and/or as known in the art at the time of filing, and/or as developed after the time of filing.

As discussed in more detail below, in one embodiment, one way the testing computing environment is distinct from the production computing environment is that at least one, and, in some embodiments, multiple or all, of the one or more connectivity restrictions imposed on the virtual assets in the production computing environment are not imposed in the testing computing environment. Consequently, as discussed below, when a designated test virtual asset is subjected to vulnerability analysis and verified in the testing computing environment, the verification system is able check for vulnerabilities that may be present in a situation where one or more of the connectivity restrictions have been removed, or changed.

In one embodiment, a class of virtual assets to be vulnerability analyzed and verified is designated.

As discussed herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases implemented, or associated with, a cloud computing environment, and/or implemented in a cloud computing environment; services associated with, and/or delivered through, a cloud computing environment;

communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

Some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets that have the same, or similar, operational parameters are created using the same set of steps, instructions, processes, code, or "recipes". Herein, the set of steps, instructions, processes, code, or recipes used to create virtual assets that have the same, or similar, operational parameters are referred to as "virtual asset creation templates."

Examples of virtual asset creation templates include, but are not limited to, any tool and/or system for creating and managing a collection of related cloud resources that have the same, or similar, operational parameters. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets that have the same, or similar, operational parameters. One specific illustrative example of such a virtual asset creation template is a cookbook or recipe tool such as a Chef Recipe or system.

Other examples of virtual asset creation templates include, but are not limited to, any virtual appliance used to instantiate virtual assets that have the same, or similar, operational parameters. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets that have the same, or similar, operational parameters, as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, the virtual asset creation template associated with, and used to create, a class of virtual assets to be verified is identified.

In one embodiment, once the virtual asset creation template associated with, and used to create, a class of virtual assets to be verified is identified, the virtual asset creation template is used to create a given example, or instance, of the virtual asset class and this instance of the virtual asset class is designated a test virtual asset.

In one embodiment, the designated test virtual asset is then deployed, e.g., instantiated, in the testing computing environment. In one embodiment, the designated test virtual asset is then subjected to vulnerability analysis and verification in the testing computing environment.

Herein the term "vulnerability" includes not only identified active security weaknesses of a virtual asset, but also any lack of compliance with one or more security policies defined in the vulnerability management data. That is to say, in one embodiment, failure to comply with any defined security policy is considered a vulnerability so that either an active vulnerability or a failure to pass security compliance verification is considered a vulnerability to be checked for as part of the vulnerability analysis. As a result, herein, the terms "verification", "verification analysis" and "vulnerability analysis" are used interchangeably.

As seen in FIG. 1, computing environment 109 is shown where, in this specific illustrative example, virtual asset creation template data 130 is shown representing a given virtual asset creation template.

As discussed in more detail below, also seen in FIG. 1 is vulnerability management policy and/or vulnerability characteristic data, represented FIG. 1 as vulnerability management data 121 of vulnerability analysis module 520. Also seen in FIG. 1 is remedy application module 180 including remedy data 110S for closing a vulnerability scanned for by scanner 100S of vulnerability analysis module 120.

Also shown in FIG. 1 is production computing environment 111 including connectivity restrictions, represented in FIG. 1 by connectivity restriction data 191. Virtual assets 193 and 195, created using virtual asset creation template data 130, are also shown as deployed, e.g., instantiated, in production computing environment 111.

Also shown in FIG. 1 is testing computing environment 112 with designated test virtual asset 197 having been created by virtual asset creation template data 130 and deployed, e.g., instantiated, in testing computing environment 112.

As discussed above, in one embodiment, one-way testing computing environment 112 is distinct from the production computing environment 111 is that at least one, and, in some embodiments, multiple or all, of the one or more connectivity restrictions, represented by connectivity restriction data 191, imposed on virtual assets 193 and 195 in production computing environment 111 are not imposed on designated test virtual asset 197 in testing computing environment 112.

Consequently, when designated test virtual asset 197 is subjected to vulnerability analysis and verified in testing computing environment 112, the verification system, e.g., vulnerability analysis module 120, is able to check for vulnerabilities that may be present in designated test virtual asset 197 in a situation where one or more of the connectivity restrictions have been removed. However, since designated test virtual asset 197 is created using the same virtual asset creation template, represented by virtual asset creation template data 130, used to create all virtual assets of the same virtual asset class, e.g., virtual assets 193 and 195, by testing designated test virtual asset 197 for vulnerabilities that may be present in a situation where one or more of the connectivity restrictions are removed, each virtual asset of the virtual asset class, e.g., virtual assets 193 and 195, is essentially also tested and verified under the same conditions.

As a result, using the method and system discussed herein, the vulnerability analysis and verification process is more complete and provides accurate data for not only situations where the virtual assets are deployed in the production computing environment exactly as intended and no changes are made to the type of connectivity, and operational parameters, but also where one or more changes to connectivity and operational parameters occur in the production computing environment. As a result, many serious vulnerabilities that could still be present in the virtual assets after conducting vulnerability analysis in the production environment can be revealed, thereby decreasing the chance of an unexpected vulnerability.

In short, in the testing computing environment, the designated test virtual asset, and therefore each virtual asset of the same class, can be subjected to any vulnerability analysis and verification process applied to any type of connectivity provided to the virtual asset in the testing computing environment. As a result, vulnerability testing or verification can be performed on the designated test virtual asset in the test computing environment associated with a type of connectivity, or operational scenario, other than the specific type of connectivity allowed for the virtual asset in the production computing environment.

In one embodiment, scans are used to identify any vulnerabilities in the designated test virtual asset. In one embodiment, the scans are selected based on vulnerability management data indicating a vulnerability management policy, specified vulnerabilities, and vulnerability characteristics to be identified and monitored.

In one embodiment, the vulnerability management data is obtained from one or more sources. In various embodiments, the vulnerabilities and vulnerability characteristics included in the vulnerability management data are openly defined, i.e., are open-ended, and include any vulnerabilities and vulnerability characteristics desired by the owner of the virtual asset creation template, and/or virtual assets, such as an application developer, and/or by the provider of the process, and/or by a provider of a distributed computing network, such as a cloud, and/or any other parties or entities associated with the security of a distributed computing network, such as a cloud.

In one embodiment, once vulnerability management data is obtained indicating the vulnerability management policies, vulnerabilities, and vulnerability characteristics to be used with the process, scanner data composed of one or more vulnerability scanners, referred to herein as "scanners", capable of detecting and monitoring the vulnerabilities and vulnerability characteristics associated the vulnerability management data is generated or obtained.

In various embodiments, the scanners included in the scanner data are designed to monitor or check to determine if specific vulnerabilities discoverable with the scanners are present. In many cases, the scanners are actually sets of scanner tests with each scanner test being associated with, i.e. capable of detecting, a specific vulnerability or vulnerability characteristic.

As noted above, vulnerabilities, and vulnerability characteristics, included in the obtained vulnerability management data are open-endedly defined and subject to change. Consequently, the scanners and scanner tests desirable and/or necessary to ensure compliance with the vulnerability management policies indicated in the vulnerability management data are likely to change over time as well. In addition, new scanners and scanner tests may be required and/or become available, existing scanners and scanner tests may be updated and/or improved, and/or new combinations of desirable scanner tests may become available.

In one embodiment, the designated test virtual asset is analyzed to identify any vulnerabilities in the designated test virtual asset, and therefore in any virtual assets of the virtual asset class, using selected scanners capable of detecting and monitoring the vulnerabilities and vulnerability characteristics associated the vulnerability management data.

Referring back to FIG. 1, scanner data including scanner 100S is shown in vulnerability analysis module 120.

In one embodiment, scanner 100S is applied to designated test virtual asset 197 in testing computing environment 112 and, in one embodiment, to virtual assets 193 and 195 in production computing environment 111.

In one embodiment, if no vulnerabilities are identified in the designated test virtual asset in the testing computing environment, the virtual asset creation template is verified and each virtual asset of the virtual asset class generated using the virtual asset creation template, including the virtual assets deployed in the production environment, is assumed to be free of the vulnerabilities tested for in the designated test virtual asset in the testing computing environment.

FIG. 1 shows scanner 100S results data 170 in vulnerability analysis module 120 indicating the results of the application of scanner 100S to designated test virtual asset 197. In one embodiment, if scanner 100S results data 170 identifies no vulnerabilities in designated test virtual asset 197, i.e., designated test virtual asset 197 is verified, the initial status of virtual assets 193 and 195, created using virtual asset creation template data 130, is set to, or transformed to, that of verified virtual asset status.

In one embodiment, if one or more vulnerabilities are identified in the designated test virtual asset, an appropriate remedy for each identified vulnerability identified in the designated test virtual asset is identified and applied at the virtual asset creation template level, e.g., the remedy is applied to the virtual asset creation template used to create both the designated test virtual asset deployed in the testing computing environment and the virtual assets deployed in the production computing environment.

In one embodiment, if one or more vulnerabilities are identified in the designated test virtual asset, an appropriate remedy for each identified vulnerability identified in the designated test virtual asset is identified and applied to each of the virtual assets deployed in the production computing environment.

In one embodiment, remedy data associated with the vulnerabilities and vulnerability characteristics scanned for by the scanners and scanner tests represented in the scanner data is obtained.

In various embodiments, the remedy data includes remedies or remedy procedures to be implemented on a virtual asset creation template, and/or the virtual assets being vulnerability managed, once the vulnerability or vulnerability characteristic associated with the remedy or remedy procedure is identified by the one or more scanners and scanner tests. To this end, each of the remedies or remedy procedures indicated in the remedy data is correlated with an associated vulnerability or vulnerability characteristic to which the remedy or remedy procedure applies, and/or the scanner or scanner test used to identify the associated vulnerability or vulnerability characteristic.

In one embodiment, data representing the correlated remedies or remedy procedures indicated in the remedy data, the associated vulnerability or vulnerability characteristics addressed by the remedies or remedy procedures, and/or the scanner or scanner tests used to identify the associated vulnerability or vulnerability characteristics, is stored in a remedy database (not shown).

Referring to FIG. 1, remedy data 110S representing the remedy and/or procedure associated with the vulnerabilities and vulnerability characteristics scanned for by scanner 100S is shown in remedy application module 180.

In one embodiment, each vulnerability identified in the designated test virtual asset is remedied by applying the identified appropriate remedy to the virtual asset creation template and/or the virtual assets.

Referring to FIG. 1, if scanner 100S results data 170 indicates the vulnerability scanned for by scanner 100S is identified in designated test virtual asset 597, then the corresponding remedy represented by remedy data 110S is obtained and applied to virtual asset creation template data 130, and/or virtual assets 193 and 195, by remedy application module 180.

In one embodiment, once each vulnerability identified in the designated test virtual asset is remedied, each virtual asset of the virtual asset class generated using the virtual asset creation template is assumed to be free of the vulnerabilities tested for in designated test virtual asset 197 and is assigned an initial status of verified virtual asset.

Using the methods and systems discussed herein, a testing computing environment is provided that is distinct from the production computing environment in that at least one, and in some cases, multiple or all, of one or more connectivity restrictions imposed on the virtual assets deployed in the production computing environment are not imposed in the testing computing environment.

Then a virtual asset creation template used to create all virtual assets of a virtual asset class is identified and used to create a designated test virtual asset in the testing computing environment. The designated test virtual asset can then be subjected to vulnerability analysis and verified in the testing computing environment where vulnerabilities that may be present in a situation where one or more of the connectivity restrictions have been removed from the production computing environment can be discovered and remedied.

As a result, using the methods and systems discussed herein, vulnerability testing or verification can be performed on the designated test virtual asset in the test computing environment associated with a type of connectivity, or operational scenario, other than the specific type of connectivity allowed for the virtual asset in the production computing environment.

In accordance with one embodiment, a process includes providing a production computing environment in which one or more virtual assets are to be deployed. In one embodiment, a virtual asset testing environment is also provided, the virtual asset testing environment being a computing environment distinct from the production computing environment.

In one embodiment, a class of virtual assets to be vulnerability tested and verified is designated. A virtual asset creation template associated with the class of virtual assets is then identified, each virtual asset of the class of virtual assets being created using the virtual asset creation template.

In one embodiment, the virtual asset creation template is used to generate a designated test virtual asset. The designated test virtual asset is then deployed in the virtual asset testing environment. Once deployed in the virtual asset testing environment, the designated test virtual asset is analyzed to identify any vulnerabilities in the designated test virtual asset.

In one embodiment, if a vulnerability is identified in the designated test virtual asset, a remedy associated with the vulnerability identified in the designated test virtual asset is applied to the virtual asset creation template to transform the virtual asset creation template to a verified virtual asset creation template. In one embodiment, the verified virtual asset creation template is then used to create virtual assets of the virtual asset class to be deployed in the production environment.

Figure 2:
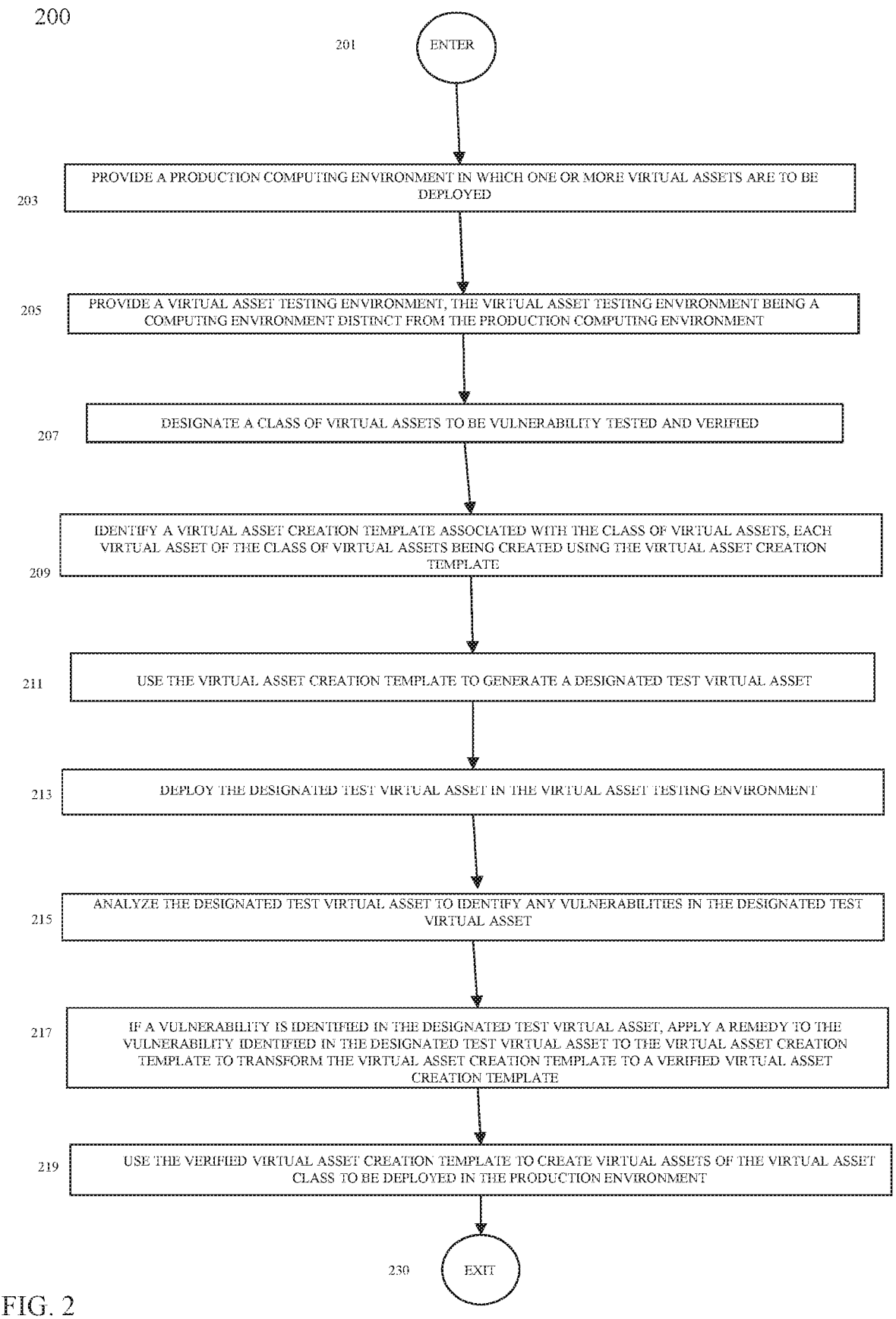
FIG. 2 is a flow chart depicting a process in accordance with one embodiment.

FIG. 2 is a flow chart of a process 200 which facilitates a vulnerability management and verification service.

In one embodiment, process 200 begins at ENTER OPERATION 201 of FIG. 2 and process flow proceeds to PROVIDE A PRODUCTION COMPUTING ENVIRONMENT IN WHICH ONE OR MORE VIRTUAL ASSETS ARE TO BE DEPLOYED OPERATION 203.

In one embodiment at PROVIDE A PRODUCTION COMPUTING ENVIRONMENT IN WHICH ONE OR MORE VIRTUAL ASSETS ARE TO BE DEPLOYED OPERATION 203 a cloud-based production computing environment is provided in which one or more virtual assets are to be deployed.

In various embodiments, the production computing environment provided at PROVIDE A PRODUCTION COMPUTING ENVIRONMENT IN WHICH ONE OR MORE VIRTUAL ASSETS ARE TO BE DEPLOYED OPERATION 203 can be any form of cloud computing environment, such as, but not limited to, a public cloud; a private cloud; a virtual private network (VPN); a Virtual Private Cloud, or VPC; a sub-net; or any security/communications grouping; or any other cloud-based infrastructure, sub-structure, or architecture, as discussed herein, and/or as known in the art at the time of filing, and/or as developed after the time of filing.

In many cases, a given application or service provided through a cloud computing infrastructure may utilize, and interface with, multiple cloud computing environments, such as multiple VPCs, in the course of providing the associated service. In various embodiments, each cloud computing environment includes allocated virtual assets associated with, and controlled or used by, the party utilizing the cloud computing environment.

As noted above, in order to ensure security policies are met, when the virtual assets are deployed in the production computing environment provided at PROVIDE A PRODUCTION COMPUTING ENVIRONMENT IN WHICH ONE OR MORE VIRTUAL ASSETS ARE TO BE DEPLOYED OPERATION 203 one or more connectivity restrictions are imposed on the virtual assets in the production computing environment. That is to say, when virtual assets are deployed in a production computing environment, they are often deployed in Virtual Private Clouds (VPCs), in designated subnets, under the control of network access control lists, in various security groups, and/or under any other connectivity controlled environment created by the imposition of one or more connectivity restrictions, as discussed herein, and/or as known in the art at the time of filing, and/or as developed after the time of filing.

As also noted above, given that one or more connectivity restrictions are imposed on the virtual assets in the production computing environment of PROVIDE A PRODUCTION COMPUTING ENVIRONMENT IN WHICH ONE OR MORE VIRTUAL ASSETS ARE TO BE DEPLOYED OPERATION 203, when a virtual asset is subjected to vulnerability analysis and verified in the production computing environment of PROVIDE A PRODUCTION COMPUTING ENVIRONMENT IN WHICH ONE OR MORE VIRTUAL ASSETS ARE TO BE DEPLOYED OPERATION 203, there is no way for the verification system to check for vulnerabilities that may be present in a situation where one or more of the connectivity restrictions have been removed.

In short, if a given virtual asset is restricted to a specific type of connectivity in the production computing environment of PROVIDE A PRODUCTION COMPUTING ENVIRONMENT IN WHICH ONE OR MORE VIRTUAL ASSETS ARE TO BE DEPLOYED OPERATION 203, then any vulnerability analysis and verification process can only be performed on the specific type of connectivity provided to the virtual asset in the production computing environment of PROVIDE A PRODUCTION COMPUTING ENVIRONMENT IN WHICH ONE OR MORE VIRTUAL ASSETS ARE TO BE DEPLOYED OPERATION 203. As a result, no vulnerability testing or verification can be performed on the virtual asset in the production computing environment of PROVIDE A PRODUCTION COMPUTING ENVIRONMENT IN WHICH ONE OR MORE VIRTUAL ASSETS ARE TO BE DEPLOYED OPERATION 203 that is associated with a different, or new, type of connectivity, or operational scenario, other than the specific type of connectivity allowed for the virtual asset in the production computing environment of PROVIDE A PRODUCTION COMPUTING ENVIRONMENT IN WHICH ONE OR MORE VIRTUAL ASSETS ARE TO BE DEPLOYED OPERATION 203.

To address this issue, in one embodiment, a virtual asset testing computing environment is provided at PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205.

In various embodiments, the provided virtual asset testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 can be any form of computing environment that is distinct and physically or logically different from the provided production computing environment of PROVIDE A PRODUCTION COMPUTING ENVIRONMENT IN WHICH ONE OR MORE VIRTUAL ASSETS ARE TO BE DEPLOYED OPERATION 203.

In various embodiments, the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 can itself be an isolated portion of a public cloud; a private cloud; a virtual private network (VPN); a Virtual Private Cloud, or VPC; a sub-net; or any security/communications grouping; or any other infrastructure, sub-structure, or architecture, as discussed herein, and/or as known in the art at the time of filing, and/or as developed after the time of filing.

As discussed in more detail below, in one embodiment, one way the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 is distinct from the production computing environment of PROVIDE A PRODUCTION COMPUTING ENVIRONMENT IN WHICH ONE OR MORE VIRTUAL ASSETS ARE TO BE DEPLOYED OPERATION 203 is that at least one, and, in some embodiments, multiple or all, of the one or more connectivity restrictions imposed on the virtual assets in the production computing environment of PROVIDE A PRODUCTION COMPUTING ENVIRONMENT IN WHICH ONE OR MORE VIRTUAL ASSETS ARE TO BE DEPLOYED OPERATION 203 are not imposed in the testing computing environment PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205. Consequently, as discussed below, when a designated test virtual asset is subjected to vulnerability analysis and verified in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205, the verification system is able check for vulnerabilities that may be present in a situation where one or more of the connectivity restrictions have been removed or a new connectivity is provided.

In one embodiment, once a production computing environment is provided at PROVIDE A PRODUCTION COMPUTING ENVIRONMENT IN WHICH ONE OR MORE VIRTUAL ASSETS ARE TO BE DEPLOYED OPERATION 203 and a testing computing environment is provided at PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205, process flow proceeds to DESIGNATE A CLASS OF VIRTUAL ASSETS TO BE VULNERABILITY TESTED AND VERIFIED OPERATION 207.

In one embodiment, at DESIGNATE A CLASS OF VIRTUAL ASSETS TO BE VULNERABILITY TESTED AND VERIFIED OPERATION 207 a class of virtual assets to be vulnerability analyzed and verified is designated.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases implemented, or associated with, a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

Some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets that have the same, or similar, operational parameters are created using the same set of steps, instructions, processes, code, or "recipes". Herein, the set of steps, instructions, processes, code, or recipes used to create virtual assets that have the same, or similar, operational parameters are referred to as "virtual asset creation templates."

Examples of virtual asset creation templates include, but are not limited to, any tool and/or system for creating and managing a collection of related cloud resources that have the same, or similar, operational parameters. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets that have the same, or similar, operational parameters. One specific illustrative example of such a virtual asset creation template is a cookbook or recipe tool such as a Chef Recipe or system.

Other examples of virtual asset creation templates include, but are not limited to, any virtual appliance used to instantiate virtual assets that have the same, or similar, operational parameters. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets that have the same, or similar, operational parameters, as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, once a class of virtual assets to be vulnerability analyzed and verified is designated at DESIGNATE A CLASS OF VIRTUAL ASSETS TO BE VULNERABILITY TESTED AND VERIFIED OPERATION 207, process flow proceeds to IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209.

In one embodiment, at IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 the virtual asset creation template associated with, and used to create, the designated class of virtual assets to be verified of DESIGNATE A CLASS OF VIRTUAL ASSETS TO BE VULNERABILITY TESTED AND VERIFIED OPERATION 207 is identified.

In one embodiment, once a virtual asset creation template associated with the class of virtual assets of DESIGNATE A CLASS OF VIRTUAL ASSETS TO BE VULNERABILITY TESTED AND VERIFIED OPERATION 207 is identified at IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209, process flow proceeds to USE THE VIRTUAL ASSET CREATION TEMPLATE TO GENERATE A DESIGNATED TEST VIRTUAL ASSET OPERATION 211.

In one embodiment, at USE THE VIRTUAL ASSET CREATION TEMPLATE TO GENERATE A DESIGNATED TEST VIRTUAL ASSET OPERATION 211 the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 is used to create a given example, or instance, of the virtual asset class and this instance of the virtual asset class is designated a test virtual asset.

In one embodiment, once the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 is used to create a designated test virtual asset at USE THE VIRTUAL ASSET CREATION TEMPLATE TO GENERATE A DESIGNATED TEST VIRTUAL ASSET OPERATION 211, process flow proceeds to DEPLOY THE DESIGNATED TEST VIRTUAL ASSET IN THE VIRTUAL ASSET TESTING ENVIRONMENT OPERATION 213.

In one embodiment, at DEPLOY THE DESIGNATED TEST VIRTUAL ASSET IN THE VIRTUAL ASSET TESTING ENVIRONMENT OPERATION 213 the designated test virtual asset of USE THE VIRTUAL ASSET CREATION TEMPLATE TO GENERATE A DESIGNATED TEST VIRTUAL ASSET OPERATION 211 is deployed, e.g., instantiated, in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205.

In one embodiment, once the designated test virtual asset of USE THE VIRTUAL ASSET CREATION TEMPLATE TO GENERATE A DESIGNATED TEST VIRTUAL ASSET OPERATION 211 is deployed, e.g., instantiated, in the testing computing environment of PROVIDE A VIRTUAL ASSET TESTING ENVIRONMENT, THE VIR- TUAL ASSET TESTING ENVIRONMENT BEING A COMPUTING ENVIRONMENT DISTINCT FROM THE PRODUCTION COMPUTING ENVIRONMENT OPERATION 205 at DEPLOY THE DESIGNATED TEST VIRTUAL ASSET IN THE VIRTUAL ASSET TESTING ENVIRONMENT OPERATION 213, process flow proceeds to ANALYZE THE DESIGNATED TEST VIRTUAL ASSET TO IDENTIFY ANY VULNERABILITIES IN THE DESIGNATED TEST VIRTUAL ASSET OPERATION 215.

In one embodiment, at ANALYZE THE DESIGNATED TEST VIRTUAL ASSET TO IDENTIFY ANY VULNERABILITIES IN THE DESIGNATED TEST VIRTUAL ASSET OPERATION 215 the designated test virtual asset of DEPLOY THE DESIGNATED TEST VIRTUAL ASSET IN THE VIRTUAL ASSET TESTING ENVIRONMENT OPERATION 213 is subjected to vulnerability analysis and verification in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205.

As noted above, herein the term "vulnerability" includes not only identified active security weaknesses of a virtual asset, but also any lack of compliance with one or more security policies defined in the vulnerability management data. That is to say, in one embodiment, failure to comply with any defined security policy is considered a vulnerability so that either an active vulnerability or a failure to pass security compliance verification is considered a vulnerability to be checked for as part of the vulnerability analysis. As a result, herein, the terms "verification", "verification analysis" and "vulnerability analysis" are used interchangeably.

As discussed above, in one embodiment, one way the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205 is distinct from the production computing environment of PROVIDE A PRODUCTION COMPUTING ENVIRONMENT IN WHICH ONE OR MORE VIRTUAL ASSETS ARE TO BE DEPLOYED OPERATION 203 is that at least one, and, in some embodiments, multiple or all, of the one or more connectivity restrictions imposed on the virtual assets in production computing environment of PROVIDE A PRODUCTION COMPUTING ENVIRONMENT IN WHICH ONE OR MORE VIRTUAL ASSETS ARE TO BE DEPLOYED OPERATION 203 are not imposed on the designated test virtual asset of DEPLOY THE DESIGNATED TEST VIRTUAL ASSET IN THE VIRTUAL ASSET TESTING ENVIRONMENT OPERATION 213 in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205.

Consequently, when the designated test virtual asset of DEPLOY THE DESIGNATED TEST VIRTUAL ASSET IN THE VIRTUAL ASSET TESTING ENVIRONMENT OPERATION 213 is subjected to vulnerability analysis and verification of ANALYZE THE DESIGNATED TEST VIRTUAL ASSET TO IDENTIFY ANY VULNERABILITIES IN THE DESIGNATED TEST VIRTUAL ASSET OPERATION 215 in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205, the verification system of ANALYZE THE DESIGNATED TEST VIRTUAL ASSET TO IDENTIFY ANY VULNERABILITIES IN THE DESIGNATED TEST VIRTUAL ASSET OPERATION 215 is able to check for vulnerabilities that may be present in the designated test virtual asset in a situation where one or more of the connectivity restrictions have been removed.

However, since the designated test virtual asset of USE THE VIRTUAL ASSET CREATION TEMPLATE TO GENERATE A DESIGNATED TEST VIRTUAL ASSET OPERATION 211 is created using the same virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 used to create all virtual assets of the same virtual asset class, by testing designated test virtual asset for vulnerabilities that may be present in a situation where one or more of the connectivity restrictions are removed at ANALYZE THE DESIGNATED TEST VIRTUAL ASSET TO IDENTIFY ANY VULNERABILITIES IN THE DESIGNATED TEST VIRTUAL ASSET OPERATION 215, each virtual asset of the virtual asset class is essentially also tested and verified under the same conditions.

As a result, using process 200 discussed herein, the vulnerability analysis and verification process is more complete and provides accurate data for both situations where the virtual assets are deployed in the production computing environment exactly as intended and no changes are made to the type of connectivity, and operational parameters, and where one or more changes to connectivity and operational parameters occur in the production computing environment. As a result, many serious vulnerabilities that could still be present in the virtual assets after conducting vulnerability analysis in the production environment can be revealed, thereby decreasing the chance of an unexpected vulnerability.

In short, in the testing computing environment of PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205, the designated test virtual asset of DEPLOY THE DESIGNATED TEST VIRTUAL ASSET IN THE VIRTUAL ASSET TESTING ENVIRONMENT OPERATION 213, and therefore each virtual asset of the same class, can be subjected to any vulnerability analysis and verification process applied to any type of connectivity provided to the virtual asset in the testing computing environment. As a result, vulnerability testing or verification can be performed on the designated test virtual asset in the test computing environment associated with a type of connectivity, or operational scenario, other than the specific type of connectivity allowed for the virtual asset in the production computing environment.

In one embodiment, at ANALYZE THE DESIGNATED TEST VIRTUAL ASSET TO IDENTIFY ANY VULNERABILITIES IN THE DESIGNATED TEST VIRTUAL ASSET OPERATION 215 scans are used to identify any vulnerabilities in the designated test virtual asset. In one embodiment, the scans are selected based on vulnerability management data indicating a vulnerability management policy, specified vulnerabilities, and vulnerability characteristics to be identified and monitored.

In one embodiment, the vulnerability management data is obtained from one or more sources. In various embodiments, the vulnerabilities and vulnerability characteristics included in the vulnerability management data are openly defined, i.e., are open-ended, and include any vulnerabilities and vulnerability characteristics desired by the owner of the virtual asset creation template, and/or virtual assets, such as an application developer, and/or by the provider of the process, and/or by a provider of a distributed computing network, such as a cloud, and/or any other parties or entities associated with the security of a distributed computing network, such as a cloud.

In one embodiment, once vulnerability management data is obtained indicating the vulnerability management policies, vulnerabilities, and vulnerability characteristics to be used with process 200, scanner data composed of one or more vulnerability scanners, referred to herein as "scanners", capable of detecting and monitoring the vulnerabilities and vulnerability characteristics associated the vulnerability management data is generated or obtained.

In various embodiments, the scanners included in the scanner data are designed to monitor or check to determine if specific vulnerabilities discoverable with the scanners are present. In many cases, the scanners are actually sets of scanner tests with each scanner test being associated with, i.e. capable of detecting, a specific vulnerability or vulnerability characteristic.

As noted above, vulnerabilities, and vulnerability characteristics, included in the obtained vulnerability management data are open-endedly defined and subject to change. Consequently, the scanners and scanner tests desirable and/or necessary to ensure compliance with the vulnerability management policies indicated in the vulnerability management data are likely to change over time as well. In addition, new scanners and scanner tests may be required and/or become available, existing scanners and scanner tests may be updated and/or improved, and/or new combinations of desirable scanner tests may become available.

In one embodiment, at ANALYZE THE DESIGNATED TEST VIRTUAL ASSET TO IDENTIFY ANY VULNERABILITIES IN THE DESIGNATED TEST VIRTUAL ASSET OPERATION 215 the designated test virtual asset is analyzed to identify any vulnerabilities in the designated test virtual asset, and therefore in any virtual assets of the virtual asset class, using selected scanners capable of detecting and monitoring the vulnerabilities and vulnerability characteristics associated the vulnerability management data.

In one embodiment, once the designated test virtual asset of USE THE VIRTUAL ASSET CREATION TEMPLATE TO GENERATE A DESIGNATED TEST VIRTUAL ASSET OPERATION 211 is subjected to vulnerability analysis and verification in the testing computing environment at ANALYZE THE DESIGNATED TEST VIRTUAL ASSET TO IDENTIFY ANY VULNERABILITIES IN THE DESIGNATED TEST VIRTUAL ASSET OPERATION 215, if no vulnerabilities are identified in the designated test virtual asset in the testing computing environment, process flow proceeds to USE THE VERIFIED VIRTUAL ASSET CREATION TEMPLATE TO CREATE VIRTUAL ASSETS OF THE VIRTUAL ASSET CLASS TO BE DEPLOYED IN THE PRODUCTION ENVIRONMENT OPERATION 219 and the virtual asset creation template is verified and each virtual asset of the virtual asset class generated using the virtual asset creation template, including the virtual assets deployed in the production environment, is assumed to be free of the vulnerabilities tested for in the designated test virtual asset in the testing computing environment.

In one embodiment, if one or more vulnerabilities are identified in the designated test virtual asset, process flow proceeds to IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217.

In one embodiment, at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217 an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 215 is identified and applied at the virtual asset creation template level of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209, e.g., the remedy is applied to the virtual asset creation template used to create both the designated test virtual asset deployed in the testing computing environment and the virtual assets deployed in the production computing environment.

In one embodiment, remedy data associated with the vulnerabilities and vulnerability characteristics scanned for by the scanners and scanner tests represented in the scanner data is obtained.

In various embodiments, the remedy data includes remedies or remedy procedures to be implemented on a virtual asset creation template, and/or the virtual assets being vulnerability managed, once the vulnerability or vulnerability characteristic associated with the remedy or remedy procedure is identified by the one or more scanners and scanner tests. To this end, each of the remedies or remedy procedures indicated in the remedy data is correlated with an associated vulnerability or vulnerability characteristic to which the remedy or remedy procedure applies, and/or the scanner or scanner test used to identify the associated vulnerability or vulnerability characteristic.

In one embodiment, data representing the correlated remedies or remedy procedures indicated in the remedy data, the associated vulnerability or vulnerability characteristics addressed by the remedies or remedy procedures, and/or the scanner or scanner tests used to identify the associated vulnerability or vulnerability characteristics, is stored in a remedy database.

In one embodiment, each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 215 is remedied by applying the identified appropriate remedy to the virtual asset creation template of IDENTIFY A VIRTUAL ASSET CREATION TEMPLATE ASSOCIATED WITH THE CLASS OF VIR- TUAL ASSETS, EACH VIRTUAL ASSET OF THE CLASS OF VIRTUAL ASSETS BEING CREATED USING THE VIRTUAL ASSET CREATION TEMPLATE OPERATION 209.

In one embodiment, once an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 215 is identified and applied to the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217, the status of the virtual asset creation template level of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 is transformed to a status of verified virtual asset creation template.

In one embodiment, once an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 215 is identified and applied to the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 and the status of the virtual asset creation template level of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209 is transformed to a status of verified virtual asset creation template at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217, process flow proceeds to USE THE VERIFIED VIRTUAL ASSET CREATION TEMPLATE TO CREATE VIRTUAL ASSETS OF THE VIRTUAL ASSET CLASS TO BE DEPLOYED IN THE PRODUCTION ENVIRONMENT OPERATION 219.

In one embodiment, at USE THE VERIFIED VIRTUAL ASSET CREATION TEMPLATE TO CREATE VIRTUAL ASSETS OF THE VIRTUAL ASSET CLASS TO BE DEPLOYED IN THE PRODUCTION ENVIRONMENT OPERATION 219 the verified virtual asset creation template of IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217 is used to create all virtual assets of the designated test virtual asset class to be verified of DESIGNATE A CLASS OF VIRTUAL ASSETS TO BE VULNERABILITY TESTED AND VERIFIED OPERATION 207.

In one embodiment, once the verified virtual asset creation template of IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSET CREATION TEMPLATE TO TRANSFORM THE VIRTUAL ASSET CREATION TEMPLATE TO A VERIFIED VIRTUAL ASSET CREATION TEMPLATE OPERATION 217 is used to create all virtual assets of the designated test virtual asset class to be verified of DESIGNATE A CLASS OF VIRTUAL ASSETS TO BE VULNERABILITY TESTED AND VERIFIED OPERATION 207 at USE THE VERIFIED VIRTUAL ASSET CREATION TEMPLATE TO CREATE VIRTUAL ASSETS OF THE VIRTUAL ASSET CLASS TO BE DEPLOYED IN THE PRODUCTION ENVIRONMENT OPERATION 219, process flow proceeds to EXIT OPERATION 230.

In one embodiment, at EXIT OPERATION 230 process 200 is exited to await new data.

Using process 200, a testing computing environment is provided that is distinct from the production computing environment in that at least one, and in some cases, multiple or all, of one or more connectivity restrictions imposed on the virtual assets deployed in the production computing environment are not imposed in the testing computing environment.

Then a virtual asset creation template used to create all virtual assets of a virtual asset class is identified and used to create a designated test virtual asset in the testing computing environment. The designated test virtual asset can then be subjected to vulnerability analysis and verified in the testing computing environment where vulnerabilities that may be present in a situation where one or more of the connectivity restrictions have been removed from the production computing environment can be discovered and remedied.

As a result, using process 200, vulnerability testing or verification can be performed on the designated test virtual asset in the test computing environment associated with a type of connectivity, or operational scenario, other than the specific type of connectivity allowed for the virtual asset in the production computing environment.

In addition, remedies are applied at the virtual asset creation template level so that a remedy can be performed for all virtual assets created using a given virtual asset creation template. Consequently, using process 200, minimal resources are required to ensure each virtual asset of a given virtual asset class is free of defined vulnerabilities and/or conforms to various, and dynamically defined, security policies.

In accordance with one embodiment, a method and system includes providing a production computing environment in which one or more virtual assets are to be deployed. In one embodiment, a virtual asset testing environment is also provided, the virtual asset testing environment being a computing environment distinct from the production computing environment.

In one embodiment, a class of virtual assets to be vulnerability tested and verified is designated. A virtual asset creation template associated with the class of virtual assets is then identified, each virtual asset of the class of virtual assets being created using the virtual asset creation template.

In one embodiment, the virtual asset creation template is used to generate a designated test virtual asset. The designated test virtual asset is then deployed in the virtual asset testing environment. Once deployed in the virtual asset testing environment, the designated test virtual asset is analyzed to identify any vulnerabilities in the designated test virtual asset.

If a vulnerability is identified in the designated test virtual asset, a remedy to the vulnerability identified in the designated test virtual asset is applied to the virtual assets of the virtual asset class deployed in the production environment.

Figure 3:
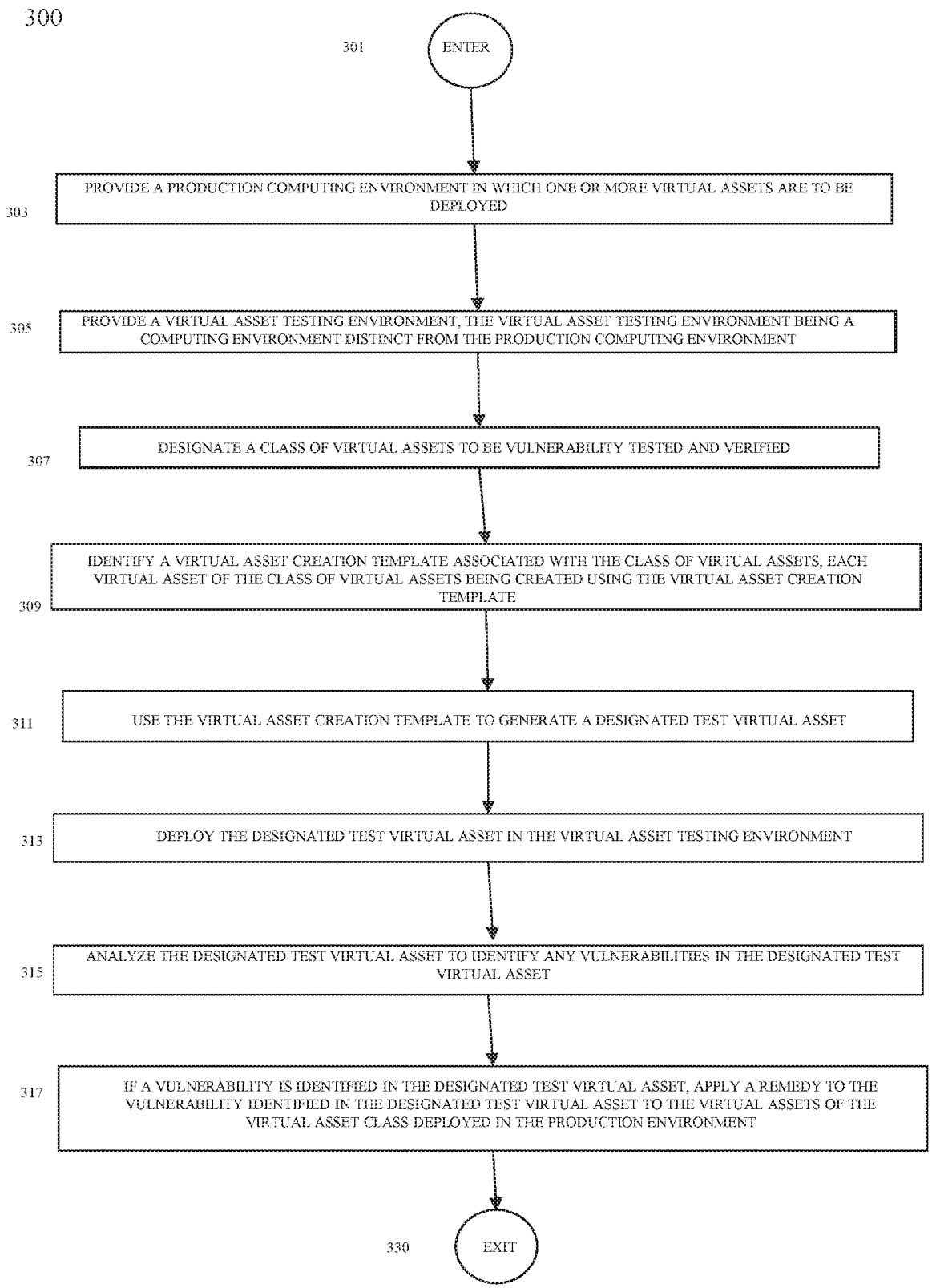
FIG. 3 is a flow chart depicting a process in accordance with one embodiment.

FIG. 3 is a flow chart of a process 300.

In one embodiment, process 300 begins at ENTER OPERATION 301 of FIG. 3 and process flow proceeds to PROVIDE A PRODUCTION COMPUTING ENVIRONMENT IN WHICH ONE OR MORE VIRTUAL ASSETS ARE TO BE DEPLOYED OPERATION 303.

In one embodiment, PROVIDE A PRODUCTION COMPUTING ENVIRONMENT IN WHICH ONE OR MORE VIRTUAL ASSETS ARE TO BE DEPLOYED OPERATION 303; PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 305; DESIGNATE A CLASS OF VIRTUAL ASSETS TO BE VULNERABILITY TESTED AND VERIFIED OPERATION 307; IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309; USE THE VIRTUAL ASSET CREATION TEMPLATE TO GENERATE A DESIGNATED TEST VIRTUAL ASSET OPERATION 311; DEPLOY THE DESIGNATED TEST VIRTUAL ASSET IN THE VIRTUAL ASSET TESTING ENVIRONMENT OPERATION 313; and ANALYZE THE DESIGNATED TEST VIRTUAL ASSET TO IDENTIFY ANY VULNERABILITIES IN THE DESIGNATED TEST VIRTUAL ASSET OPERATION 315 of process 300 are substantially identical to PROVIDE A PRODUCTION COMPUTING ENVIRONMENT IN WHICH ONE OR MORE VIRTUAL ASSETS ARE TO BE DEPLOYED OPERATION 203; PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 205; DESIGNATE A CLASS OF VIRTUAL ASSETS TO BE VULNERABILITY TESTED AND VERIFIED OPERATION 207; IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 209; USE THE VIRTUAL ASSET CREATION TEMPLATE TO GENERATE A DESIGNATED TEST VIRTUAL ASSET OPERATION 211; DEPLOY THE DESIGNATED TEST VIRTUAL ASSET IN THE VIRTUAL ASSET TESTING ENVIRONMENT OPERATION 213; and ANALYZE THE DESIGNATED TEST VIRTUAL ASSET TO IDENTIFY ANY VULNERABILITIES IN THE DESIGNATED TEST VIRTUAL ASSET OPERATION 215 of process 200.

Consequently the reader is referred to the discussion above for a more detailed description of PROVIDE A PRODUCTION COMPUTING ENVIRONMENT IN WHICH ONE OR MORE VIRTUAL ASSETS ARE TO BE DEPLOYED OPERATION 303; PROVIDE A VIRTUAL ASSET TESTING ENVIRONMENT, THE VIRTUAL ASSET TESTING ENVIRONMENT BEING A COMPUTING ENVIRONMENT DISTINCT FROM THE PRODUCTION COMPUTING ENVIRONMENT OPERATION 305; DESIGNATE A CLASS OF VIRTUAL ASSETS TO BE VULNERABILITY TESTED AND VERIFIED OPERATION 307; IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309; USE THE VIRTUAL ASSET CREATION TEMPLATE TO GENERATE A DESIGNATED TEST VIRTUAL ASSET OPERATION 311; DEPLOY THE DESIGNATED TEST VIRTUAL ASSET IN THE VIRTUAL ASSET TESTING ENVIRONMENT OPERATION 313; and ANALYZE THE DESIGNATED TEST VIRTUAL ASSET TO IDENTIFY ANY VULNERABILITIES IN THE DESIGNATED TEST VIRTUAL ASSET OPERATION 315.

In one embodiment, once the designated test virtual asset of USE THE VIRTUAL ASSET CREATION TEMPLATE TO GENERATE A DESIGNATED TEST VIRTUAL ASSET OPERATION 311 is subjected to vulnerability analysis and verification in the testing computing environment at ANALYZE THE DESIGNATED TEST VIRTUAL ASSET TO IDENTIFY ANY VULNERABILITIES IN THE DESIGNATED TEST VIRTUAL ASSET OPERATION 315, if no vulnerabilities are identified in the designated test virtual asset in the testing computing environment, each virtual asset of the virtual asset class generated using the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309 is assumed to be free of the vulnerabilities tested for in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 315 and process flow proceeds to EXIT OPERATION 330.

In one embodiment, if one or more vulnerabilities are identified in the designated test virtual asset, process flow proceeds to IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSETS OF THE VIRTUAL ASSET CLASS DEPLOYED IN THE PRODUCTION ENVIRONMENT OPERATION 317.

In one embodiment, at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSETS OF THE VIRTUAL ASSET CLASS DEPLOYED IN THE PRODUCTION ENVIRONMENT OPERATION 317 an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 315 is identified and applied to each of the virtual assets created by the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309 and deployed in the production computing environment of PROVIDE A PRODUCTION COMPUTING ENVIRONMENT IN WHICH ONE OR MORE VIRTUAL ASSETS ARE TO BE DEPLOYED OPERATION 303.

In one embodiment, once an appropriate remedy for each vulnerability identified in the designated test virtual asset at ANALYZE THE DESIGNATED TEST VIRTUAL ASSET TO IDENTIFY ANY VULNERABILITIES IN THE DESIGNATED TEST VIRTUAL ASSET OPERATION 315 is identified and applied to each of the virtual assets created by the virtual asset creation template of IDENTIFY A VIRTUAL ASSET CREATION TEMPLATE ASSOCIATED WITH THE CLASS OF VIRTUAL ASSETS, EACH VIRTUAL ASSET OF THE CLASS OF VIRTUAL ASSETS BEING CREATED USING THE VIRTUAL ASSET CREATION TEMPLATE OPERATION 309 and deployed in the production computing environment of PROVIDE A PRODUCTION COMPUTING ENVIRONMENT IN WHICH ONE OR MORE VIRTUAL ASSETS ARE TO BE DEPLOYED OPERATION 303 at IF A VULNERABILITY IS IDENTIFIED IN THE DESIGNATED TEST VIRTUAL ASSET, APPLY A REMEDY TO THE VULNERABILITY IDENTIFIED IN THE DESIGNATED TEST VIRTUAL ASSET TO THE VIRTUAL ASSETS OF THE VIRTUAL ASSET CLASS DEPLOYED IN THE PRODUCTION ENVIRONMENT OPERATION 317, process flow proceeds to EXIT OPERATION 330.

In one embodiment, at EXIT OPERATION 330 process 300 is exited to await new data.

Using process 300, a testing computing environment is provided that is distinct from the production computing environment in that at least one, and in some cases, multiple or all, of one or more connectivity restrictions imposed on the virtual assets deployed in the production computing environment are not imposed in the testing computing environment.

Then a virtual asset creation template used to create all virtual assets of a virtual asset class is identified and used to create a designated test virtual asset in the testing computing environment. The designated test virtual asset can then be subjected to vulnerability analysis and verified in the testing computing environment where vulnerabilities that may be present in a situation where one or more of the connectivity restrictions have been removed from the production computing environment can be discovered and remedied.

As a result, using process 300, vulnerability testing or verification can be performed on the designated test virtual asset in the test computing environment associated with a type of connectivity, or operational scenario, other than the specific type of connectivity allowed for the virtual asset in the production computing environment.

In the second part of the two-part system, virtual assets are created and deployed from a virtual asset creation template that has been verified by the first part of the two-part system, and the deployed virtual assets each include a built-in monitoring system, a virtual asset agent, which provides oversight and monitoring capabilities, to ensure that the virtual assets are protected and fully repaired.

Figure 4:
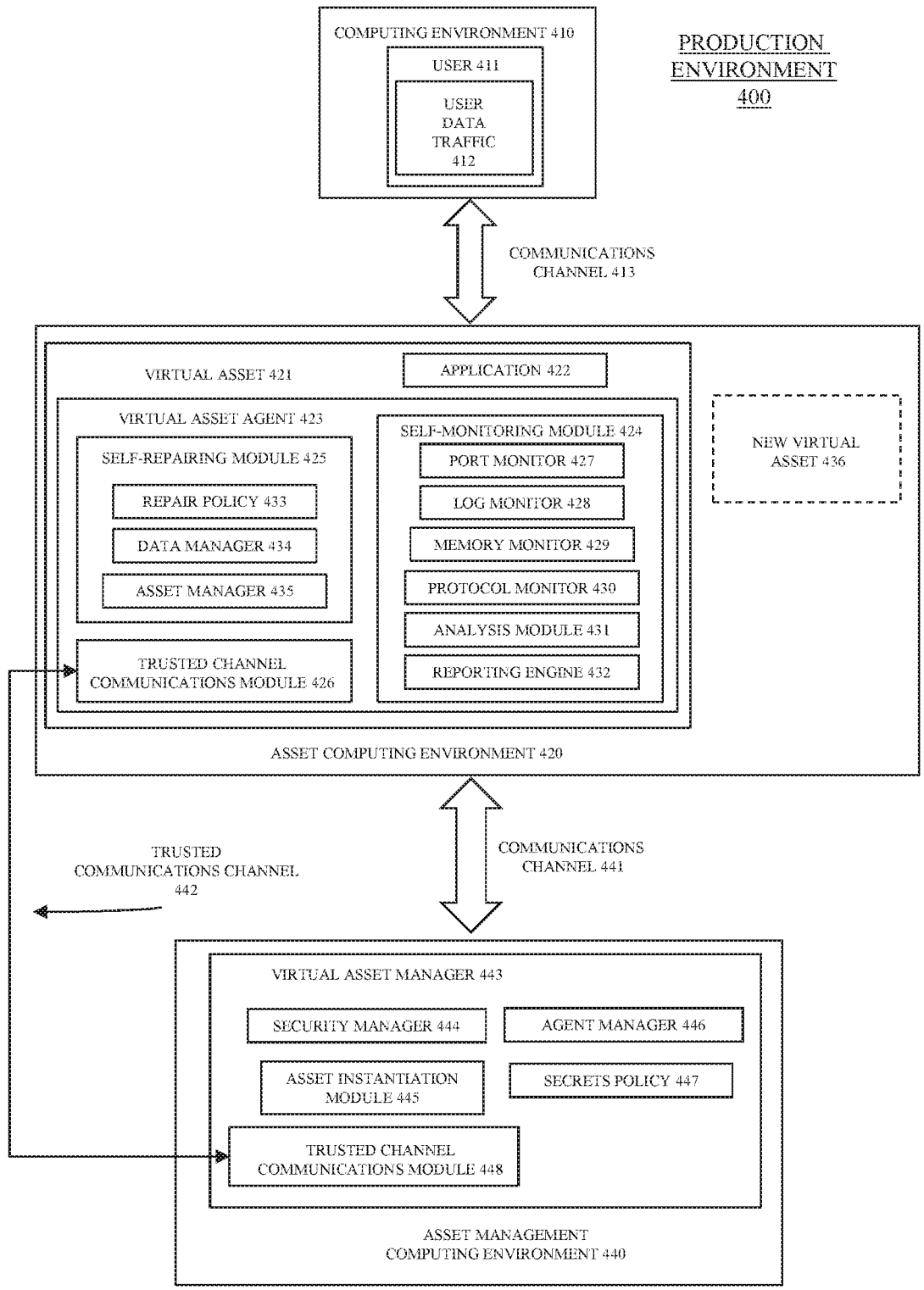
FIG. 4 is a block diagram of a hardware architecture for protecting and repairing a virtual asset from damage by potential security threats, in accordance with one embodiment.

FIG. 4 illustrates a block diagram of a production environment 400 for protecting and repairing a virtual asset from damage by potential security threats, according to one embodiment. Once security threats, such as malicious software, have been injected or introduced into a virtual asset or computing environment, it can be difficult to remove the security threats or malicious code. Furthermore, all future communications to and from the virtual asset or computing environment can be compromised. For example, the security threat or malicious code can include communications monitors which can detect and/or intercept any software patches or security updates received by the asset in order to repair, scan, or otherwise remove the security threats.

According to one embodiment, an agent is installed on a virtual asset to monitor the asset for security threats or breaches and to prepare the asset for if/when potential security threats or breaches are detected. According to one embodiment, monitoring for potential security threats or breaches includes comparing a number of authorized open communication ports to a number of communication ports that are actually open in a virtual asset. In another embodiment, the agent is configured to monitor one or more logs, monitor memory, monitor network protocols, and/or monitor other features or characteristics of the virtual asset and compare the operations of the virtual asset to one or more predetermined nominal or expected values. According to various embodiments, self-repairing the virtual asset includes copying or backing up data, instantiating a new asset, providing the new asset with the backed up copies of data, and terminating or decommissioning the virtual asset that has been identified as being compromised. In other embodiments, self-repairing includes waiting for user traffic to subside or decrease, prior to failing the compromised asset over to the new or replacement virtual asset, according to one embodiment. The agent and/or an asset management computing system/environment is configured to establish secure communications channels to transfer secrets, e.g., passwords, passcodes, encryption keys, or the like, and/or security updates. As discussed above, if a security update is transmitted to a compromised virtual asset, an existing security threat or malicious code that has gained access into the virtual asset can undermine the efficacy of the security update by detecting, subverting, and/or monitoring the functionality of the security update. Thus, an advantage of the present disclosure is that the agent is configured to establish a trusted communication channel to receive security updates and/or to create or instantiate a new or uncompromised virtual asset to replace the compromised virtual asset, according to one embodiment.

Production environment 400 includes various computing environments for protecting and repairing a virtual asset from damage by potential security threats, according to one embodiment. Production environment 400 includes a computing environment 410 communicatively coupled to an asset computing environment 420, according to one embodiment. Production environment 400 also includes an asset management computing environment 440 communicatively coupled to asset computing environment 420 and configured to manage one or more virtual assets hosted by or existing within asset computing environment 420, according to one embodiment.

Computing environment 410 includes a user 411 that transmits and receives user data traffic 412 via communications channel 413, according to one embodiment. User 411 can represent one or more computing systems configured to transmit, receive, store, update, manage, and/or otherwise manipulate information or applications hosted by virtual assets within asset computing environment 420, according to various embodiments. For example, user 411 can represent a subscriber to one or more services hosted by a virtual asset, such as Web services, database services, financial services, educational services, video services, social networking services, computing services, and/or the like, according to various embodiments.

Communication channel 413 can include one or more public or private networks or communications channels for communicating between the computing environment 410 and the asset computing environment 420. According to one embodiment, communication channel 413 includes one or more networks, such as a LAN, WAN, PAN, intranet, and/or the Internet.

Asset computing environment 420 is configured to host one or more virtual assets 421 that are enabled for self-monitoring, self-repairing, and establishing trusted communications channels with one or more other computing environments, according to one embodiment. Virtual asset 421 is an allocation of one or more hardware, software, and/or firmware resources to one or more customers or tenants. The tenant may purchase, rent, lease, borrow, or otherwise receive authorization to install, operate, transfer, and/or host applications and/or data with virtual asset 421, according to one embodiment. Virtual asset 421 includes application 422 and virtual asset agent 423, according to one embodiment. Application 422 provides an interface to user 411 and can provide one or more databases, computing, or other services to user 411.

Virtual asset agent 423 monitors and repairs virtual asset 421, in addition to establishing trusted communications channels with other computing environments to initialize and/or update virtual asset 421, according to one embodiment. In one embodiment, virtual asset agent 423 is always running, for example, as a background program, e.g., a daemon, for virtual asset 421. In another embodiment, virtual asset agent 423 is selectively and/or periodically executed in response to one or more triggers such as a timer, instantiation of virtual asset 421, user traffic, erroneous operation, or the like. Virtual asset agent 423 includes self-monitoring module 424, self-repairing module 425, and trusted channel communications module 426, according to one embodiment.

Self-monitoring module 424 includes various modules and engines to monitor the security status and/or health of virtual asset 421, according to one embodiment. Self-monitoring module 424 includes, but is not limited to, port monitor 427, log monitor 428, memory monitor 429, protocol monitor 430, analysis module 431, and reporting engine 432, according to one embodiment.

Port monitor 427 is configured to monitor each of the communication ports of virtual asset 421 for suspicious activity and/or characteristics. For example, if virtual asset 421 has opened/configured 13 different communication ports for use and port monitor 427 detects 14 open communication ports, then self-monitoring module 424 notes the discrepancy and notifies one or more administrators of the discrepancy.

Log monitor 428 is configured to read log files generated by virtual asset agent 423 or generated by virtual asset 421. For example, in one embodiment, virtual asset agent 423 or virtual asset 421 creates log files which record messages sent from the virtual asset 421. Log monitor 428 checks each of the Internet protocol ("IP") addresses of messages sent/transmitted by virtual asset 421. For example, log monitor 428 is configured, in one embodiment, to periodically, e.g., every half-hour or every 12 hours, check all IP addresses of messages sent within the last predetermined period of time. Log monitor 428 applies, in one embodiment, geographical location ("geolocation") detection utilities to each of the IP addresses to determine the approximate destination of the transmitted message. If, for example, a message has been transmitted to a prohibited or suspicious city, state, country, or region, e.g., rural Afghanistan, log monitor 428 is, in one embodiment, configured to alert an administrator, or otherwise flag the activity for self-monitoring module 424.

Memory monitor 429 is configured to monitor one or more memory locations allocated to virtual asset 421 for potential security breaches and/or security threats, according to one embodiment. Memory monitor 429 checks memory blocks or locations for particular good or bad patterns or signatures. The good patterns or signatures, e.g., a checksum, indicate that particular programs or memory locations have not been changed or maliciously manipulated. Bad/malicious patterns or signatures, e.g., a virus signature, indicate that particular programs or memory locations have been infected by malicious software or code. Upon detecting one or more malicious patterns or signatures, memory monitor 429 flags the signatures or patterns for further review or action by self-monitoring module 424 or for an administrator, according to one embodiment.

Protocol monitor 430 is configured check the various network protocols to determine whether or not use of the network protocols is appropriate and/or expected, according to one embodiment. For example, protocol monitor 430 checks the number of network protocols used to determine whether or not too many protocols have been used. Protocol monitor 430 also checks, in one embodiment, the types of protocols used to determine the appropriateness of the types of protocols used. For example, if virtual asset 421 is configured to provide non-database services, but network protocols related to database services are being employed, protocol monitor 430 can flag the database-related protocol as potentially inappropriate so that the use of the protocol can be further evaluated. Protocol monitor 430 is configured to also analyze characteristics of the protocols. For example, protocol monitor 430 is configured compare the elements, commands, and/or sizes of protocol payloads to historic and/or expected and/or typical characteristics and can flag any anomalies or aberrations as suspicious or potentially inappropriate, according to one embodiment.

Analysis module 431 is configured, in one embodiment, to receive one or more flags from the monitors within self-monitoring module 424 and is also configured to compare and/or analyze the content of the flags or notifications received. For example, analysis module 431 can maintain one or more tables or other data structures that identify which flagged behaviors have already been reviewed and/or dismissed by one or more analysts or administrators. Analysis module 431 is also configured, in one embodiment, to forward potentially valid security threats or security breaches to reporting engine 432.

Reporting engine 432 transmits one or more reports to self-repairing module 425, to asset management computing environment 440, to one or more system administrators, and/or to the tenant to which virtual asset 421 is allocated, according to one embodiment. According to one embodiment, reporting engine 432 uses trusted channel communications module 426 to establish a trusted communication channel with asset management computing environment 440 to report suspicious and/or inappropriate operations, behaviors, characteristics, or other information determined by self-monitoring module 424, according to one embodiment.

Self-repairing module 425 receives one or more flags, alerts, warnings, and/or reports from self-monitoring module 424, e.g., reporting engine 432, and performs self-repair operations in accordance with the weight or seriousness of the received flags, alerts, warnings, and/or reports, according to one embodiment. Self-repairing module 425 includes repair policy 433, data manager 434, and asset manager 435. Self-repairing module 425 uses repair policy 433, data manager 434, and asset manager 435 to determine the weight or severity of potential security breaches/threats and to create new or clean instances of virtual asset 421 if the security breach/threat is determined to be too severe to repair, according to one embodiment.

Self-repairing module 425 uses repair policy 433 to determine if virtual asset agent 423 should create a new instance of virtual asset 421, according to one embodiment. Repair policy 433 receives notification of the various flags, alerts, warnings, and/or reports from reporting engine 432. Repair policy 433 then compares the content of the received reports to one or more tables, databases, or other data structures to determine if the security of virtual asset 421 can withstand the risks associated with the generated flags, alerts, and/or warnings, according to one embodiment. For example, repair policy 433 includes a predetermined numerical threshold which, if exceeded, self-repairing module 425 is configured to create a new instance of the virtual asset 421. For example, repair policy 433 has a predetermined value of 60 points. Repair policy 433 assigns each type of identified security threat or identified potential security threat a point value based on its potential effect or severity on virtual asset 421. If the sum of the points of the identified security threats exceeds the predetermined value of the repair policy, then self-repairing module 425 or repair policy 433 determines that a new instance of virtual asset 421 is to be created, according to one embodiment. In one embodiment, security threats or risks that can control communications to and from a virtual asset are given a higher weight of seriousness than security threats that simply slow down or interrupt the service provided by virtual asset 421. Similarly, identified security threats or breaches that compromise sensitive information, such as credit card information, personal user information, or other user financial information, are assigned a higher weight, seriousness, or priority than other identified security threats or breaches, according to one embodiment.

Self-repairing module 425 attempts to repair an identified security threat or breach if repair policy 433 determines that the security threat or breach is relatively minor, according to one embodiment. In one embodiment, a security threat or breach is relatively minor if the severity of the security threat or breach is below a predetermined threshold. For example, self-repairing module 425 is configured, in one embodiment, to interface with one or more anti-virus or anti-malware software programs and is also configured to automatically execute one or more anti-virus or anti-malware software programs in response to identifying one or more security threats or breaches in virtual asset 421. In another embodiment, repair policy 433 can be configured to establish a trusted communication channel using trusted channel communications module 426 to notify asset management computing environment 440 of the security threat or breach. Repair policy 433 then uses trusted channel communications module 426 to receive one or more security updates or security patches for execution on virtual asset 421 to repair the one or more security threats or breaches, according to one embodiment. In one embodiment, trusted channel communications module 426 and/or other parts of virtual asset agent 423 perform validation of the authenticity of software, data, or other information received over the trusted communication channel established by trusted channel communications module 426. In some embodiments, asset management computing environment 440 requests and retrieves the security update or security patch from a third party, e.g., a software security vendor, and transmits the security update or security patch to the virtual asset agent upon verification of the validity or authenticity of the security update or security patch.

Self-repairing module 425 creates a new instance of virtual asset 421 if the repair policy 433 determines that one or more security threats or breaches are relatively major and/or are difficult to remove/repair. Self-repairing module 425 uses data manager 434 to back up the data associated with virtual asset 421. In the case that virtual asset 421 is configured to provide database services, data manager 434 creates a copy of one or more databases and stores the copies in a location that is external to virtual asset 421, e.g., in another memory store within asset computing environment 420, according to one embodiment. Once the new instance is in place, self-repairing module 425 can cause the database to fail over to the new instance of the database in the new instance of the virtual asset. In other embodiments, data manager 434 transmits backup copies of the data to one or more cloud storage vendors for temporary storage, according to one embodiment.

Self-repairing module 425 uses asset manager 435 to re-instantiate virtual asset 421, according to one embodiment. Asset manager 435 is configured, in one embodiment, to communicate with asset management computing environment 440 and initialize or create another or new virtual asset 436 within asset computing environment 420. Asset manager 435 can initialize new virtual asset 436 to reflect the content and operations of virtual asset 421. Asset manager 435 initializes new virtual asset 436 with a copy of virtual asset agent 423 and with a copy of the data that was backed up with data manager 434, according to one embodiment. Asset manager 435 is also configured to initialize new virtual asset 436 with a copy of application 422, according to one embodiment. In one embodiment, asset manager 435 retains a copy of application 422 as it was initially injected into virtual asset 421 and injects the retained copy into new virtual asset 436 during initialization of new virtual asset 436. During initialization of new virtual asset 436, asset manager 435 requests clean or updated copies of the secrets used during the operations of virtual asset 421. Trusted channel communications module 426 is operable to provide a trusted communication channel between virtual asset 421 and asset management computing environment 440 or between new virtual asset 436 and asset management computing environment 440. The delivery of the clean or updated version of the secrets of virtual asset 421 to new virtual asset 436 enables new virtual asset 436 to establish secure communications, decode and/or encrypt databases, transmit information through one or more gateways, and the like. In one embodiment, asset manager 435 requests an updated version of the secrets for virtual asset 421 through trusted channel communications module 426 to prevent or reduce the risk of interception of the secrets by one or more security threats or otherwise malicious programs, according to one embodiment.

After asset manager 435 receives verification that new virtual asset 436 is properly operating, from asset management computing environment 440 or from new virtual asset 436, asset manager 435 initiates a self-destruct or decommissioning operation to remove virtual asset 421 from asset computing environment 420, or to render virtual asset 421 inoperable, according to one embodiment. For example, according to one embodiment, asset manager 435 communicates with asset computing environment 420 or with asset management computing environment 440 to disassociate, erase, or otherwise forfeit the memory locations, memory blocks, or memory resources that were previously allocated for use by virtual asset 421.

Asset management computing environment 440 is communicatively coupled to asset computing environment 420 through a communication channel 441 and a trusted communication channel 442 to manage one or more virtual assets in asset computing environment 420, according to one embodiment. Asset management computing environment 440 includes virtual asset manager 443 that is configured to provide security updates and provide copies of secrets to the virtual assets of asset computing environment 420, according to one embodiment. In other embodiments, virtual asset manager 443 is also configured to instantiate virtual assets within asset computing environment 420.

Virtual asset manager 443 includes one or more of security manager 444, asset instantiation module 445, and agent manager 446, secrets policy 447, and trusted channel communications module 448, according to one embodiment. Security manager 444 receives flags, alerts, warnings, and/or reports of security threats/breaches or other suspicious activities or communications associated with the virtual asset 421. Security manager 444 is configured to facilitate repair policy 433 in determining whether self-repairing module 425 will create a new instance of the virtual asset 421 or repair the current security threats, according to one embodiment. Security manager 444 is configured, in one embodiment, to provide repair policy 433 with lists, names, and or characteristics of new security threats as they emerge and are identified. Security manager 444 is also configured to manage one or more lists, tables, or other data structures relating to operations or characteristics that self-monitoring module 424 should search for while monitoring virtual asset 421, according to one embodiment.

Asset instantiation module 445 communicates with self-repairing module 425 to support the creation of one or more new instances of virtual asset 421, e.g., new virtual asset 436, according to one embodiment. As described above, self-repairing module 425 is configured to instantiate new versions or instances of virtual asset 421 without the support of asset management computing environment 440. In other embodiments, when self-repairing module 425 determines that a new instance of virtual asset 421 should be created, self-repairing module 425 requests that virtual asset manager 443 create a new instance of virtual asset 421, and asset instantiation module 445 creates the new instance of virtual asset 421 in asset computing environment 420, according to one embodiment. Asset instantiation module 445 communicates with secrets policy 447 and with agent manager 446 to instantiate or initialize new virtual asset 436 with a copy of virtual asset agent 423 and with clean and/or updated copies of any secrets associated with virtual asset 421. By providing the secrets associated with virtual asset 421, new virtual asset 436 is enabled to perform, take over, and/or continue any operations that were previously executed or performed by virtual asset 421, according to one embodiment.

Virtual asset manager 443 uses trusted channel communications module 448 to communicate with virtual asset agent 423 by trusted communication channel 442, in one embodiment. The ability for virtual asset manager 443 to communicate with the virtual asset 421 via the communication channel 441 and via the trusted communication channel 442 reduces the risk that a security threat, e.g., the malicious software program, will intercept, detect, and/or undermine the efficacy of any security updates provided by virtual asset manager 443 to virtual asset agent 423, according to one embodiment. For example, virtual asset manager 443, e.g., security manager 444, is configured to use trusted channel communications module 448 to transmit updates to virtual asset agent 423 via trusted communication channel 442 to enable virtual asset agent 423 to operate with up-to-date anti-virus, anti-malware, or other security features, according to one embodiment. In another embodiment, virtual asset manager 443 is configured to periodically transmit updated copies of secrets to virtual asset 421 in accordance with secrets policy 447. For example, secrets policy 437 may determine that secrets for virtual asset 421 are updated/refreshed on a quarterly, semiannual, annual, biannual, etc., basis. Accordingly, the asset management computing environment 440 communicates with virtual asset 421 with trusted communication channel 442: to update secrets for virtual asset 421; to update virtual asset agent 423; to selectively create new instances of virtual asset 421; and/or to support the ability of virtual asset 421 and virtual asset agent 423 in monitoring and repairing potential and actual security threats or breaches that may compromise the contents and/or operations of virtual asset 421, according to various embodiments.

Figure 5:
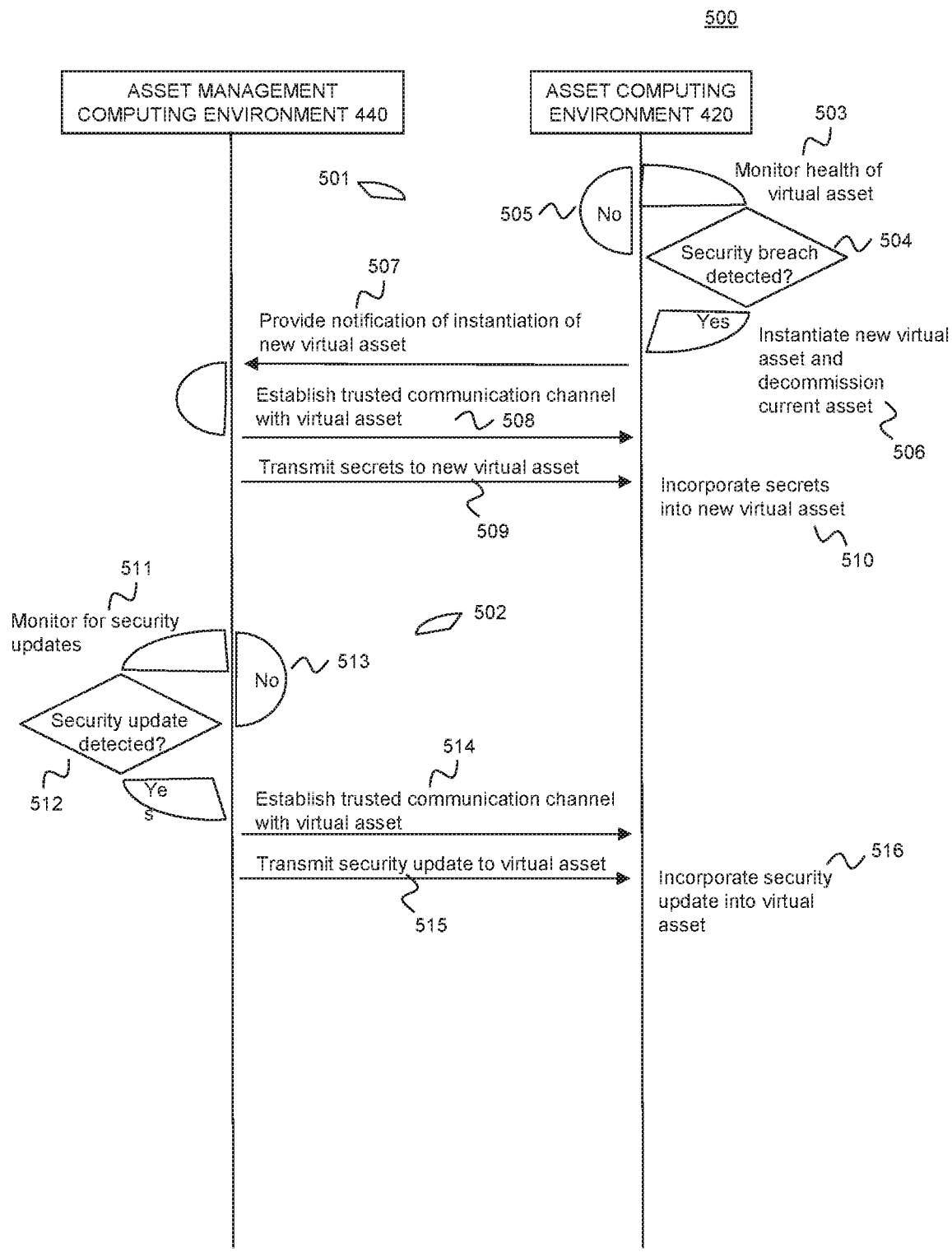
FIG. 5 is a function flow diagram of the hardware architecture of FIG. 4, in accordance with one embodiment.

FIG. 5 illustrates functional diagram 500 of the production environment 400, according to one embodiment. Referring to FIG. 4 and FIG. 5 together, asset computing environment 420 includes virtual assets that use virtual asset agents to self-monitor for security threats and breaches and to self-repair identified/detected security threats and breaches within the virtual assets, according to one embodiment. In some embodiments, the virtual asset agents create or instantiate instances of new virtual assets instead of attempting to specifically identify and remove security threats, such as malicious code or programs, from existing instances of virtual assets. Functional diagram 500 of production environment 400 can be roughly broken into two processes 501 and 502, which may be executed concurrently or sequentially (in either order), according to various embodiments. Process 501 is associated with monitoring for and repairing security threats within virtual asset 421 by using virtual asset agent 423, according to one embodiment. Process 502 is associated with providing security updates to virtual asset 421, e.g., virtual asset agent 423, according to another embodiment.

At 503, asset computing environment 420 monitors the health of the virtual asset, e.g., virtual asset 421, according to one embodiment. As described above, self-monitoring module 424 is configured to monitor various aspects of virtual asset 421, such as, communication ports, logs, memory, and network protocols, according to one embodiment.

At 504, asset computing environment 420 determines whether a security breach has been detected, according to one embodiment. More specifically, analysis module 431 of self-monitoring module 424, or repair policy 433 of self-repairing module 425, determines whether a security breach has been detected and may determine whether the severity of the security breach warrants further action. If virtual asset agent 423 determines that no further action should be taken, the process follows path 505 and asset computing environment 420 continues to monitor health of the virtual asset, e.g., virtual asset 421.

At 506, asset computing environment 420, or virtual asset agent 423, determines that a major or severe security breach has been detected, asset computing environment 420 instantiates a new virtual asset, e.g., new virtual asset 436, and decommissions the current virtual asset, e.g., virtual asset 421, according to one embodiment. Instantiation of new virtual asset 436 can include copying data of virtual asset 421, creating new virtual asset 436, transferring the copy of the data to new virtual asset 436, installing an instance of virtual asset agent 423 onto new virtual asset 436, and/or installing an instance of application 422 onto new virtual asset 436, according to one embodiment. Decommissioning virtual asset 421 includes, in one embodiment, erasing or reallocating memory that was allocated to virtual asset 421. According to one embodiment, the current virtual asset is a first virtual asset and the new virtual asset is a second virtual asset.

At 507, asset computing environment 420 provides notification of instantiation of the new virtual asset, e.g., new virtual asset 436, to asset management computing environment 440, according to one embodiment. Asset computing environment 420 may establish a trusted or secure communication channel with asset management computing environment 440 prior to providing notification of the instantiation of new virtual asset 436, according to one embodiment.

At 508, asset management computing environment 440 establishes a trusted communication channel with the new virtual asset, e.g., new virtual asset 436, and at 509, asset management computing environment 440 transmits secrets to new virtual asset, e.g., new virtual asset 436, according to one embodiment. The secrets transmitted to new virtual asset 436 is, in one embodiment, a copy of the secrets of virtual asset 421. The copy of the secrets enable new virtual asset 436 to continue the operations of virtual asset 421, according to one embodiment.

At 510, asset computing environment 420, e.g., new virtual asset 436, incorporates the received secrets into the new virtual asset, e.g., the new virtual asset 436, according to one embodiment. Incorporation of the secrets enable new virtual asset 436 to established communications, to decode or encrypt databases, and to transmit messages through various gateways and communication paths, according to one embodiment.

Process 501 and process 502 are executed sequentially, in either order, or can be executed concurrently, according to various embodiments. At 511, asset management computing environment 440 monitors for security updates, according to one embodiment. Asset management computing environment 440 is configured to monitor various computer security vendors' websites or databases for security updates or other information related to new security threats. At 512, asset management computing environment 440 determines if a security update has been detected. If asset management computing environment 440 determines that a security update has not been detected, at 513, process 502 returns to monitoring for security updates. If asset management computing environment 440 determines that a security update has been detected, at 514, asset management computing environment 440 establishes a trusted communication channel with the virtual asset, e.g., virtual asset 421 or new virtual asset 436, according to one embodiment. At 515, using the established trusted communication channel, asset management computing environment 440 transmits the security update to the virtual asset, e.g., virtual asset 421 or new virtual asset 436, according to one embodiment. The security update includes any one of a number of security updates, such as security patches, software updates, or the like.

At 516, asset computing environment 420, e.g., virtual asset agent 423 or new virtual asset 436, incorporates the security update into the virtual asset, e.g., virtual asset 421 or new virtual asset 436, according to one embodiment.

Figure 6:
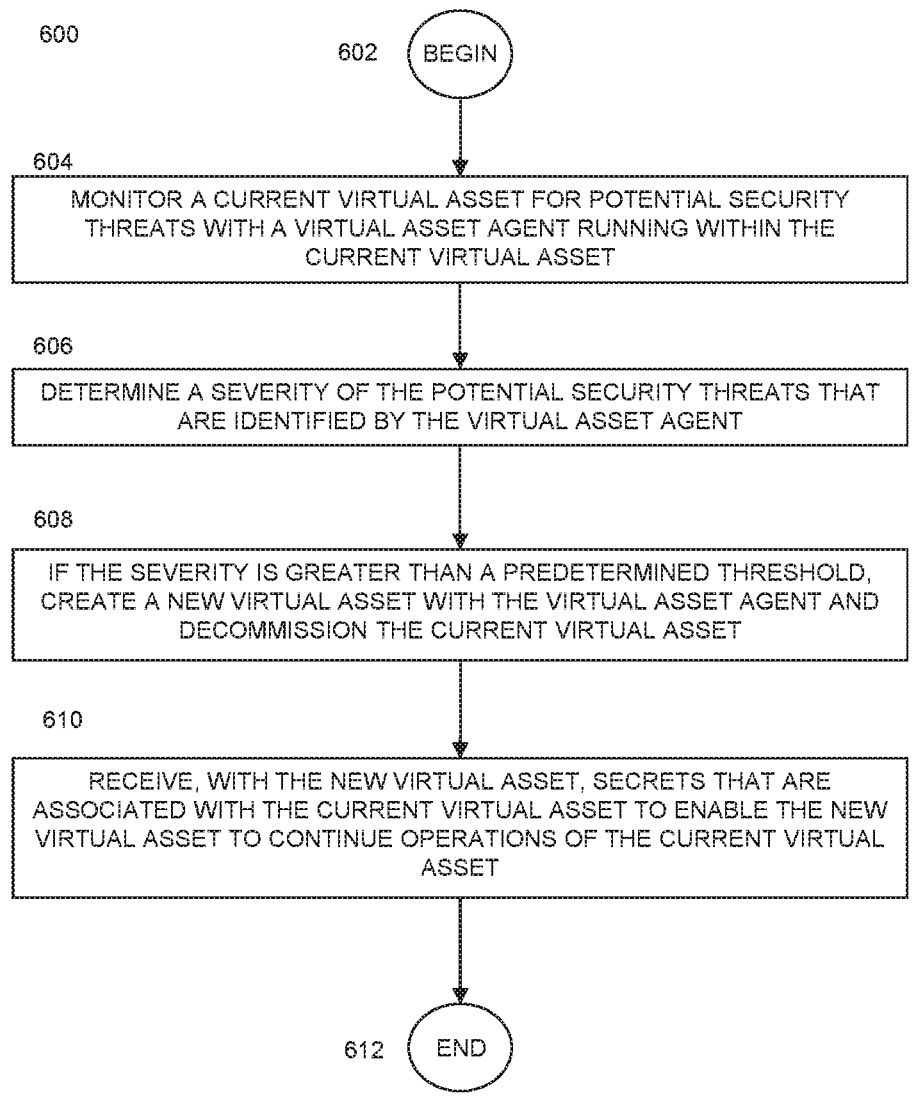
FIG. 6 is flow diagram, in accordance with one embodiment.

FIG. 6 is flow diagram of a process 600, in accordance with one embodiment.

At block 602, the process begins.

At block 604, the process monitors a current virtual asset for potential security threats with a virtual asset agent running within the current virtual asset, according to one embodiment. The virtual asset agent runs within the current virtual asset to identify the potential security threats that risk compromising virtual asset data to unauthorized computing systems.

At block 606, the process determines a severity of the potential security threats that are identified by the virtual asset agent for having gained access into the current virtual asset, according to one embodiment. The severity of the potential security threats is related to a content of the virtual asset data. For example, if the content of the virtual asset data is financial information or security information such as passwords, passcodes, or credit card information, the severity of the potential security threats will be greater than if the content includes information that is hosted on a public website or webpage.

At block 608, if the severity is greater than a predetermined threshold, the process creates a new virtual asset with the virtual asset agent and decommissions the current virtual asset, according to one embodiment. In one embodiment, creating the new virtual asset includes copying the virtual asset data to the new virtual asset, copying one or more applications hosted by the current virtual asset to the new virtual asset, and copying the virtual asset agent to the new virtual asset to enable the new virtual asset to protect and repair the new virtual asset from the damage by the potential security threats.

At block 610, the process receives, with the new virtual asset, secrets that are associated with the current virtual asset to enable the new virtual asset to continue operations of the current virtual asset, according to one embodiment. For example, upon receiving the secrets of the current virtual asset, the new virtual asset is enabled to decrypt and encrypt one or more databases and establish communications channels previously used by the current virtual asset, according to one embodiment. The secrets are received from an asset management computing system and include passwords, passcodes, encryption keys, and other secrets known to those of ordinary skill and/or later developed.

At block 612, the process ends.

Figure 7:
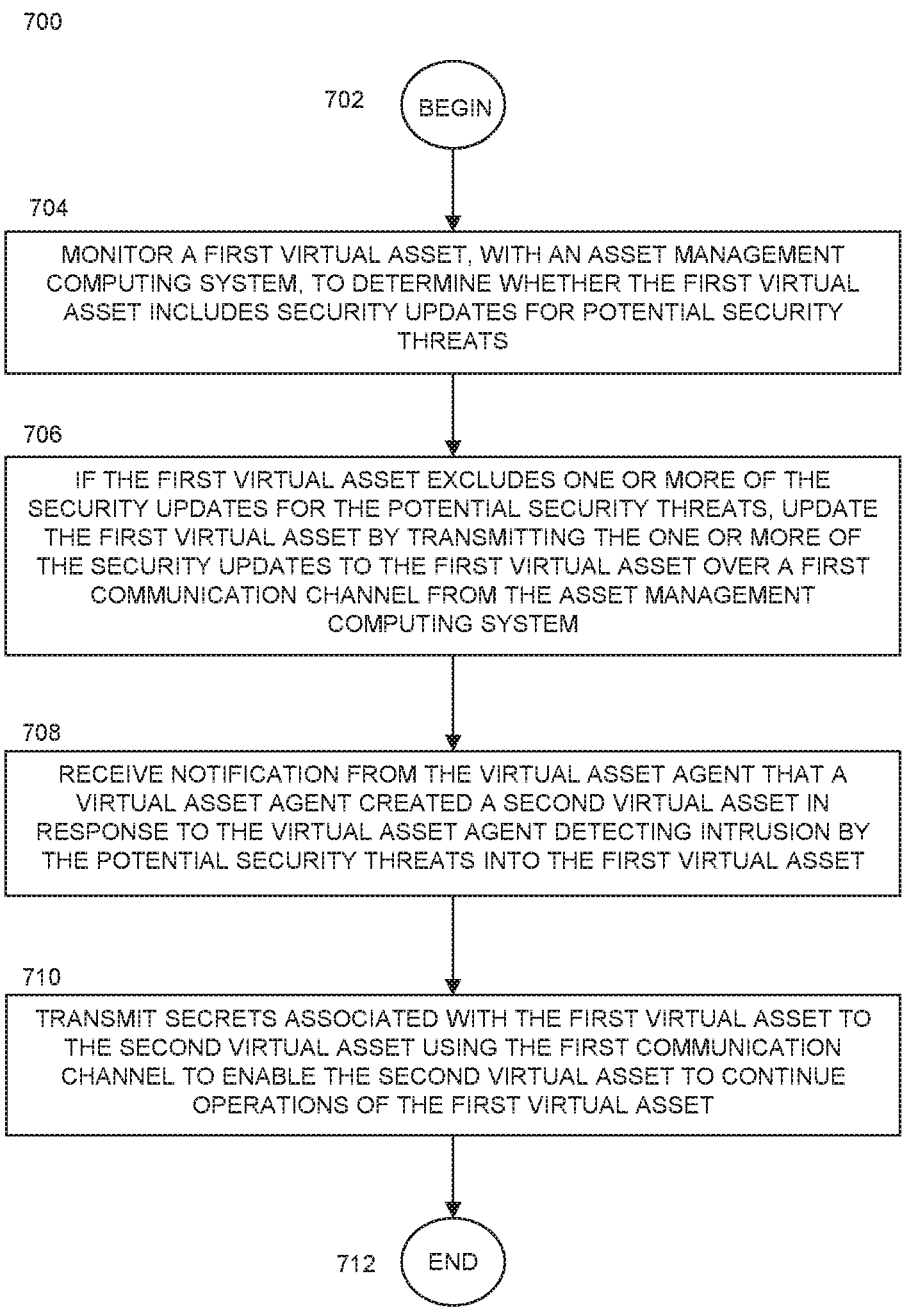
FIG. 7 is a flow diagram, in accordance with one embodiment.

FIG. 7 is a flow diagram of a process 700, in accordance with one embodiment.

At block 702, the process begins.

At block 704, the process monitors the first virtual asset, with an asset management computing system, to determine whether the first virtual asset includes security updates for the potential security threats, according to one embodiment. The first virtual asset includes a virtual asset agent configured to monitor the first virtual asset for the potential security threats and repair the first virtual asset from the damage by the potential security threats.

At block 706, if the first virtual asset does not include one or more of the security updates for the potential security threats, the process updates the first virtual asset by transmitting the one or more of the security updates to the first virtual asset over a first communication channel from the asset management computing system, according to one embodiment. The first communication channel is a trusted or secure communication channel. The first communication channel is different than a second communication channel that is used by the asset management computing system to transmit and receive information over the Internet, according to one embodiment.

At block 708, the process receives notification from the virtual asset agent that the virtual asset agent created a second virtual asset in response to the virtual asset agent detecting intrusion by the potential security threats into the first virtual asset, according to one embodiment.

At block 710, the process transmits secrets associated with the first virtual asset to the second virtual asset using the first communication channel to enable the second virtual asset to continue operations of the first virtual asset, according to one embodiment. Operations of the first asset include, but are not limited to, providing database services, computing services, financial services or other cloud-based or network-based services.

At block 712, the process ends.

As noted above, the specific illustrative examples discussed above are but illustrative examples of implementations of embodiments of methods and processes. Those of skill in the art will readily recognize that other implementations and embodiments are possible. Therefore, the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for replacing a potentially threatening virtual asset, the system comprising:
   one or more processors; and
   at least one memory coupled to the one or more processors and storing instructions that, when executed by the one or more processors, causes the system to perform operations comprising:
      generating a test virtual asset from a virtual asset creation template;
      deploying the test virtual asset in a virtual asset testing environment;
      identifying a vulnerability in the deployed test virtual asset;
      remedying a corresponding vulnerability in the virtual asset creation template based on the identified vulnerability in the deployed test virtual asset;
      generating a current virtual asset from the remedied virtual asset creation template;
      deploying the current virtual asset in a production computing environment;
      identifying a security threat, in the deployed current virtual asset, having a level of severity greater than a value; and
      replacing the current virtual asset with a new virtual asset configured to monitor and protect the new virtual asset from the identified security threat.

2. The system of claim 1, wherein execution of the instructions causes the system to perform operations further comprising:
   deploying the test virtual assets in the virtual asset testing environment; and
   deploying the virtual assets in the production computing environment, wherein the production computing environment is distinct from the virtual asset testing environment.

3. The system of claim 1, wherein execution of the instructions causes the system to perform operations further comprising:
   deploying a current virtual asset agent within the current virtual asset; and
   identifying the security threat, using the current virtual asset agent, based on a determination that the security threat gained access to information stored within the current virtual asset.

4. The system of claim 3, wherein execution of the instructions causes the system to perform operations further comprising:
   deploying a new virtual asset agent within the new virtual asset, wherein the new virtual asset agent includes at least one of a same operational parameter, a same communication feature, a same connectivity feature, a same allocated storage capability, a same allocated processing capability, a same allocated hardware, or a same allocated software as the current virtual asset agent.

5. The system of claim 1, wherein execution of the instructions causes the system to perform operations further comprising:
   requesting and installing a software update from an asset management computing system in response to the level of severity being greater than the value.

6. The system of claim 1, wherein the new virtual asset is configured to monitor at least one of a communication port, a log file, a memory location, or a network protocol.

7. The system of claim 1, wherein the new virtual asset is configured to compare a number of authorized open ports of the current virtual asset with a number of actual open ports of the current virtual asset.

8. The system of claim 1, wherein identifying the security threat comprises:
   determining a destination Internet Protocol (IP) address of a message received from the current virtual asset;
   determining a geographical location associated with the destination IP address; and
   determining that the geographical location is within a flagged region.

9. The system of claim 1, wherein execution of the instructions causes the system to perform operations further comprising:
   refraining from imposing a connectivity restriction on the deployed test virtual asset; and
   imposing the connectivity restriction on the deployed current virtual asset.

10. The system of claim 1, wherein execution of the instructions causes the system to perform operations further comprising:
    installing a new version of a virtual asset agent onto the new virtual asset.

11. A method for replacing a potentially threatening virtual asset, the method performed by one or more processors of a system and comprising:
    generating a test virtual asset from a virtual asset creation template;
    deploying the test virtual asset in a virtual asset testing environment;
    identifying a vulnerability in the deployed test virtual asset;

remedying a corresponding vulnerability in the virtual asset creation template based on the identified vulnerability in the deployed test virtual asset;

generating a current virtual asset from the remedied virtual asset creation template;

deploying the current virtual asset in a production computing environment;

identifying a security threat in the deployed current virtual asset having a level of severity greater than a value; and replacing the current virtual asset with a new virtual asset configured to monitor and protect the new virtual asset from the identified security threat.

12. The method of claim 11, further comprising:

deploying the test virtual assets in the virtual asset testing environment; and deploying the virtual assets in the production computing environment, wherein the production computing environment is distinct from the virtual asset testing environment.

13. The method of claim 11, further comprising:

deploying a current virtual asset agent within the current virtual asset; and identifying the security threat, using the current virtual asset agent, based on a determination that the security threat gained access to information stored within the current virtual asset.

14. The method of claim 13, further comprising:

deploying a new virtual asset agent within the new virtual asset, wherein the new virtual asset agent includes at least one of a same operational parameter, a same communication feature, a same connectivity feature, a same allocated storage capability, a same allocated processing capability, a same allocated hardware, or a same allocated software as the current virtual asset agent.

15. The method of claim 11, further comprising:

requesting and installing a software update from an asset management computing system in response to the level of severity being greater than the value.

16. The method of claim 11, wherein the new virtual asset is configured to monitor at least one of a communication port, a log file, a memory location, or a network protocol.

17. The method of claim 11, wherein the new virtual asset is configured to compare a number of authorized open ports of the current virtual asset with a number of actual open ports of the current virtual asset.

18. The method of claim 11, wherein identifying the security threat comprises:

determining a destination Internet Protocol (IP) address of a message received from the current virtual asset;

determining a geographical location associated with the destination IP address; and determining that the geographical location is within a flagged region.

19. The method of claim 11, further comprising:

refraining from imposing a connectivity restriction on the deployed test virtual asset; and imposing the connectivity restriction on the deployed current virtual asset.

20. The method of claim 11, further comprising:

installing a new version of a virtual asset agent onto the new virtual asset.

\* \* \* \* \*